(12) United States Patent
Yabuki et al.

(10) Patent No.: US 6,778,712 B1
(45) Date of Patent: Aug. 17, 2004

(54) DATA SHEET IDENTIFICATION DEVICE

(75) Inventors: Maki Yabuki, Kawasaki (JP); Shinichi Eguchi, Kawasaki (JP); Kouichi Kanamoto, Kawasaki (JP); Katsutoshi Kobara, Kawasaki (JP); Koichi Chiba, Kawasaki (JP); Toshiyuki Waida, Kawasaki (JP); Kazunori Yamamoto, Kawasaki (JP); Yutaka Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 09/650,762

(22) Filed: Aug. 29, 2000

(30) Foreign Application Priority Data

Dec. 20, 1999 (JP) .......................................... 11-361897

(51) Int. Cl.[7] ............................. G06K 9/54; G06K 9/60; G06K 9/34
(52) U.S. Cl. ....................... 382/305; 382/173; 382/175; 382/199; 382/203; 382/229
(58) Field of Search ................................ 382/173–180, 382/199, 203, 205, 224–229, 135, 137, 305, 306; 358/403, 404

(56) References Cited

U.S. PATENT DOCUMENTS

| 5,202,933 A | * | 4/1993 | Bloomberg | .................. 382/176 |
| 5,293,429 A | * | 3/1994 | Pizano et al. | ................ 382/202 |
| 5,303,313 A | * | 4/1994 | Mark et al. | .................. 382/235 |
| 5,444,840 A | * | 8/1995 | Froessl | ........................... 707/2 |
| 5,841,905 A | * | 11/1998 | Lee | ............................ 382/203 |
| 6,137,905 A | * | 10/2000 | Takaoka | ...................... 382/173 |

FOREIGN PATENT DOCUMENTS

| JP | 4-273391 A | 9/1992 |
| JP | 5-266244 A | 10/1993 |
| JP | 6-89365 A | 3/1994 |
| JP | 6-174838 A | 6/1994 |
| JP | 6-251193 A | 9/1994 |
| JP | 6-309498 A | 11/1994 |
| JP | 6-318246 A | 11/1994 |
| JP | 7-311867 A | 11/1995 |
| JP | 8-153242 A | 6/1996 |
| JP | 8-305796 A | 11/1996 |
| JP | 8-305921 A | 11/1996 |
| JP | 9-6863 A | 1/1997 |
| JP | WO97/05561 | 2/1997 |
| JP | 9-73500 A | 3/1997 |
| JP | 9-76597 A | 3/1997 |
| JP | 9-204492 A | 8/1997 |
| JP | 9-259222 A | 10/1997 |
| JP | 09305701 A | * 11/1997 | ............ G06K/9/20 |
| JP | 9-305707 A | 11/1997 |
| JP | 10-162102 A | 6/1998 |
| JP | 10-198757 A | 7/1998 |
| JP | 63-310090 A | 12/1998 |
| JP | 11-8476 A | 1/1999 |
| JP | 11-66229 A | 3/1999 |
| JP | 11-96296 A | 4/1999 |
| JP | 11-143986 A | 5/1999 |
| JP | 11-184965 A | 7/1999 |
| JP | 11-203405 A | 7/1999 |
| JP | 11-232392 A | 8/1999 |

* cited by examiner

Primary Examiner—Timothy M. Johnson
Assistant Examiner—Yubin Hung
(74) Attorney, Agent, or Firm—Arent Fox PLLC

(57) ABSTRACT

A data sheet identification device of the invention includes: a character/graphics extracting section, an identical shape deciding section, a graphics collating section, an identification code/data sheet ID identifying section for collating characters that have been decided to have the same shape with an identification code/data sheet ID database in which a plurality of characters showing features of a plurality of data sheets respectively have been registered, and an identifying section for uniquely identifying the data sheet based on a result of the collation by the graphics collating section and a result of the collation by the identification code/data sheet ID identifying section.

18 Claims, 37 Drawing Sheets

FIG.16A
FIG.16B
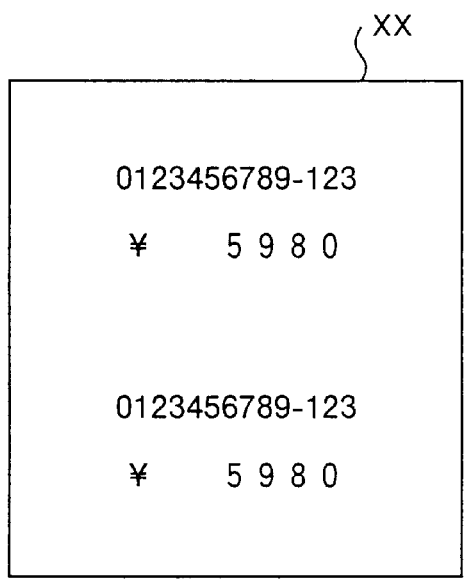
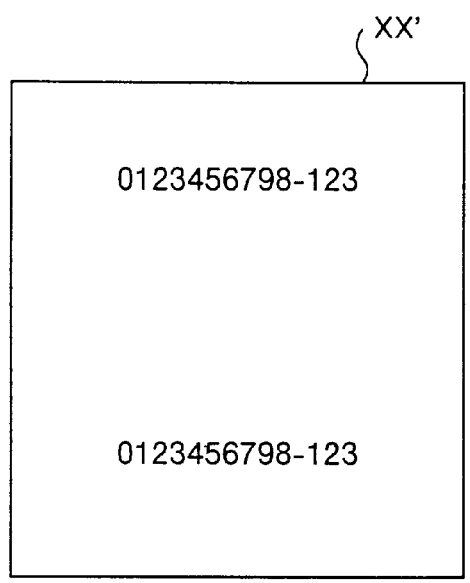

FIG.19A  FIG.19B

KIND OF DATA SHEET = 012345
CUSTOMER NUMBER = 9876

KIND OF DATA SHEET = 9876
CUSTOMER NUMBER 012345

| ☆ DATA SHEET A | | 0123456789 |
|---|---|---|
| NUMBER | 0123456789-123 | *FUJITSU* |
| AMOUNT | ¥ 5 9 8 0 | (SEAL) |

$K_a$

| ☆ RECEIPT | | |
|---|---|---|
| | | *FUJITSU* |
| NUMBER | 0123456789-123 | (SEAL) |
| AMOUNT | ¥ 5 9 8 0 | |

| ★ DATA SHEET B | | 0123456798 |
|---|---|---|
| NUMBER | 0123456798-123 | *FUJITSU* |
| AMOUNT | ¥ 5 9 8 0 | (SEAL) |
| DELAYED PAYMENT AMOUNT | ¥ 2 0 0 | |

$K_b$

| ★ RECEIPT | | |
|---|---|---|
| | | *FUJITSU* |
| NUMBER | 0123456798-123 | (SEAL) |
| AMOUNT | ¥ 6 1 8 0 | |

DEBIT NOTE A  MR. TARO FUJITSU

| CLAIMED AMOUNT | ¥145000 |
|---|---|
| CUSTOMER CODE | 1234567890-24680-112 |

※ REMARKS: PLEASE MAKE PAYMENT BY XXX DATE OF YYY MONTH

SEAL

RECEIPT  MR. TARO FUJITSU

| PAYMENT AMOUNT |
|---|
| ¥145000 |
| CUSTOMER CODE |
| 1234567890-24680-112 |

DEBIT NOTE B  MR. JIRO FUJITSU

| CLAIMED AMOUNT | ¥347000 |
|---|---|
| CUSTOMER CODE | 1234567890-13579-112 |
| | SEAL |

RECEIPT  MR. JIRO FUJITSU

| PAYMENT AMOUNT | ¥347000 |
|---|---|
| CUSTOMER CODE | |
| 1234567890-13579-112 | |
| RECEIPT SEAL | |

DEBIT NOTE C  MISS HANAKO FUJITSU

| CLAIMED AMOUNT | ¥88800 |
|---|---|
| CUSTOMER CODE | 9876543210-12345-112 |

※ REMARKS: PLEASE MAKE PAYMENT BY XXX DATE OF YYY MONTH

SEAL

RECEIPT  MISS HANAKO FUJITSU

| PAYMENT AMOUNT |
|---|
| ¥88800 |
| CUSTOMER CODE |
| 9876543210-12345-112 |

1000C

DATA SHEET IDENTIFICATION DEVICE

FIELD OF THE INVENTION

The present invention relates to a data sheet identification device that can be suitably used for a data sheet processing in a financial institution and others.

BACKGROUND IF THE INVENTION

In recent years, there has been developed a data sheet identification device as a device for identifying a data sheet (a medium exclusively used for a recognition processing) based on a process of reading information on the data sheet as optical image information, processing the read image and then identifying the data sheet. This data sheet identification device has now been widely used by various industries to improve their operation efficiency.

In a financial institution and a like industry, operators at windows are processing data sheets by using data sheet identification devices. In order to improve the work efficiency of data sheet processing, it has been required that one data sheet identification device can automatically process data sheets having various kinds of formats, not only that the data sheet identification device can process a large volume of data sheets of the same kind. As a data sheet identification device that meets this requirement, there has been a data sheet identification device that catches ruled lines printed on a data sheet as a feature for identifying the data sheet. The data sheet identification device that catches the ruled lines as the feature of the data sheet has been disclosed in PCT International Patent Publication No. WO97/05561.

According to the data sheet identification device disclosed in the above publication, a data sheet X shown in FIG. 35A is discriminated from a data sheet X' shown in FIG. 35C based on a difference between ruled lines printed on both data sheets. In this example, an oval Ka portion is different from an oval Kb portion between the data sheet X and the data sheet X'. In other words, the data sheet X is different from the data sheet X' in that while a ruled line does not exist at the oval Ka portion in the data sheet X, a ruled line exists at the oval Kb portion in the data sheet X'.

The operation of identifying the data sheet X shown in FIG. 35A will be explained next. First, the data sheet identification device optically reads an image (ruled lines, characters, graphics) printed on the data sheet X, and obtains image information. Then, the data sheet identification device processes the image information to extract only ruled-line information Xk shown in FIG. 35B. Next, the data sheet identification device collates the ruled-line information Xk with a database relating to ruled-line information of various data sheets, and identifies the data sheet X from among these various data sheets.

Similarly, for identifying the data sheet X' shown in FIG. 35C, the data sheet identification device optically reads an image (ruled lines, characters, graphics) printed on the data sheet X', and obtains image information. Then, the data sheet identification device processes the image information to extract only ruled-line information Xk' shown in FIG. 35D. Next, the data sheet identification device collates the ruled-line information Xk' with the database relating to ruled-line information of various data sheets, and identifies the data sheet X' from among these various data sheets.

In this case, the ruled-line information Xk is different from the ruled-line information Xk' in that an oval Ka' portion is different from an oval Kb' portion. In other words, while a ruled line does not exist at the oval Ka' portion in the data sheet Xk, a ruled line exists at the oval Kb' portion in the data sheet Xk'. Therefore, the data sheet identification device recognizes that the data sheet X and the data sheet X' are different kinds of data sheets.

As explained above, according to the conventional data sheet identification device (PCT International Patent Publication No. WO97/05561), the data sheet identification device identifies data sheets based on ruled lines. Therefore, when the printing precision is poor on a certain data sheet, there has been a problem that this data sheet is identified by error as the same kind of data sheet as the other data sheet although they are actually different kinds of data sheets.

As a specific example, when the data sheet X' shown in FIG. 35C has been printed in a state that the ruled line of the oval Kb portion has been blurred and dropped, the data sheet identification device obtains the ruled-line information Xk' shown in FIG. 35D in a state that the ruled-line information at the oval Kb' portion has been dropped. In other words, the data sheet identification device recognizes the ruled-line information Xk' as the ruled-line information Xk (FIG. 35B) that is actually different from the ruled-line information Xk'. As a result, the data sheet identification device recognizes by error that the data sheet X and the data sheet X' are of the same of data sheets.

Further, in financial institutions and others, data sheets are also identified based on a difference between data sheet identification codes printed on data sheets, instead of based on a difference between formats like ruled lines printed on data sheets. The operation of identifying data sheets 1000A to 1000C shown in FIG. 36A to FIG. 36C based on data sheet identification codes will be explained next. In this case, a data sheet identification code is a 10-digit code of "customer code".

A data sheet identification code of the data sheet 1000A is "1234567890", and a data sheet identification code of the data sheet 1000B is "1234567890" which is the same as the data sheet identification code of the data sheet 1000A. On the other hand, a data sheet identification code of the data sheet 1000C is "9876543210" which is different from the data sheet identification codes of the data sheet 1000A and the data sheet 1000B. Therefore, in the financial institutions, the data sheet 1000A and the data sheet 1000B are handled as the same data sheets because of the same data sheet identification code.

However, among the data sheet 1000A to the data sheet 1000C, the ruled lines of the data sheet 1000A are the same as the ruled lies of the data sheet 1000C, and the ruled lines of the data sheet 1000A and the data sheet 1000C are different from the ruled lines of the data sheet 1000B. Therefore, according to the conventional data sheet identification device, there has been a problem that the data sheet 1000A and the data sheet 1000C are identified as the same data sheets by error because of their same ruled lines although the data sheet 1000A and the data sheet 1000B should actually be handled as the same data sheets.

SUMMARY OF THE INVENTION

It is an object of the present invention to provide a data sheet identification device having improved identification precision.

In order to achieve the above object, according to a first aspect of the present invention, there is provided a data sheet identification device comprising: character/graphics extracting unit (corresponding to a character/graphics extracting section 50 in a first embodiment to be described later) for extracting characters (including character strings) and graphics from image information of a data sheet that has been read by image reading unit; identical shape deciding unit (corresponding to a identical shape deciding section 60 in the first embodiment to be described later) for deciding whether or not there exist a plurality of characters and graphics having the same shape among a plurality of characters and graphics that have been extracted by the character/graphics extracting unit; graphic collating unit (corresponding to a graphics collating section 80 in the first embodiment to be described later) for collating graphics that have been decided to have the same shape with a graphic database in which a plurality of graphics showing features of a plurality of data sheets respectively have been registered; character collating unit (corresponding to an identification code/data sheet ID identifying section 150 in the first embodiment to be described later) for collating characters that have been decided to have the same shape with a character database in which a plurality of characters showing features of a plurality of data sheets respectively have been registered; and identifying unit (corresponding to an identifying section 230 in the first embodiment to be described later) for uniquely identifying the data sheets based on a result of the collation by the graphic collating unit and a result of the collation by the character collating unit.

According to the above aspect, when a plurality of characters and graphics have been extracted by the character/graphics extracting unit, the identical shape deciding unit makes a decision as to whether or not there exist a plurality of characters and graphics that have the same shape among these characters and graphics. Thus, the graphic collating unit collates the graphic database with the graphics that have been decided to have the same shape. In parallel with this operation, the character collating unit collates the character database with the characters that have been decided to have the same shape. The identifying unit uniquely identifies the data sheets based on a result of the collation by the graphic collating unit and a result of the collation by the character collating unit.

As described above, according to the first aspect, the data sheets are identified uniquely based on the result of the collation relating to graphics and characters that have been decided to have the same shapes respectively. Therefore, it is possible to correctly identify data sheets that are otherwise erroneously identified by the conventional identification method based on a result of the collation relating to ruled lines. As a result, it is possible to improve the precision of identification.

Further, according to a second aspect of the invention, there is provided a data sheet identification device comprising: character/graphics extracting unit (corresponding to a character/graphics extracting section 50 in a second embodiment to be described later) for extracting characters (including character strings) and graphics from image information of a data sheet that has been read by image reading unit; identical shape deciding unit (corresponding to a identical shape deciding section 60 in the second embodiment to be described later) for deciding whether or not there exist a plurality of graphics having the same shape among a plurality of graphics that have been extracted by the character/graphics extracting unit; graphic collating unit (corresponding to a graphics collating section 80 in the second embodiment to be described later) for collating graphics that have been decided to have the same shape with a graphic database in which a plurality of graphics showing features of a plurality of data sheets respectively have been registered; identical character deciding unit (corresponding to an identical character string deciding section 310 in the second embodiment to be described later) for deciding whether or not there exist a plurality of the same characters among a plurality of characters that have been extracted by the character/graphics extracting unit; character collating unit (corresponding to an identification code/data sheet ID identifying section 150 in the second embodiment to be described later) for collating characters that have been decided to be the same with a character database in which a plurality of characters showing features of a plurality of data sheets respectively have been registered; and identifying unit (corresponding to an identifying section 230 in the second embodiment to be described later) for uniquely identifying the data sheets based on a result of the collation by the graphic collating unit and a result of the collation by the character collating unit.

According to the above aspect, when a plurality of characters and graphics have been extracted by the character/graphics extracting unit, the identical shape deciding unit makes a decision as to whether or not there exist a plurality of graphics that have the same shape among these graphics. Thus, the graphic collating unit collates the graphic database with the graphics that have been decided to have the same shape. In parallel with this operation, the identical character deciding unit makes a decision as to whether or not there exist a plurality of the same characters among the plurality of characters that have been extracted by the character/graphics extracting unit. Thus, the character collating unit collates the character database with the characters that have been decided to be the same. The identifying unit uniquely identifies the data sheets based on a result of the collation by the graphic collating unit and a result of the collation by the character collating unit.

As described above, according to the second aspect, the data sheets are identified uniquely based on the result of the collation relating to graphics that have been decided to have the same shape and the characters that have been decided to be the same. Therefore, it is possible to correctly identify data sheets that are otherwise erroneously identified by the conventional identification method based on a result of the collation relating to ruled lines. As a result, it is possible to improve the precision of identification.

Further, according to a third aspect of the invention, there is provided a data sheet identification device of the first or second aspect, wherein the character/graphics extracting unit extracts the characters and graphics from a result of image information of which image has been adjusted.

According to the above aspect, image information is adjusted such as, for example, noise is removed from the image information. Characters and graphics are then extracted from a result of this image adjustment. Therefore, it is possible to further improve the identification precision of the data sheets without receiving an influence of noise.

Further, according to a fourth aspect of the invention, there is provided a data sheet identification device of the first aspect, wherein the identical shape deciding unit makes a decision about characters and graphics of the same shape based on a result of a correction including at least a rotation, an expansion and a contraction carried out for those which are to be compared among the plurality of characters (including character strings) and graphics that have been extracted by the character/graphics extracting unit.

According to the above aspect, a correction including a rotation, an expansion and a contraction is carried out for characters and graphics that are to be compared among those that have been extracted. Therefore, it is possible to avoid an influence of image deterioration that is generated at the time of reading data sheets.

Further, according to a fifth aspect of the invention, there is provided a data sheet identification device of the first aspect, wherein the identical shape deciding unit makes a decision about whether or not there exist a plurality of characters and graphics that are at least partly in the same shape among a plurality of characters (including character strings) and graphics that have been extracted by the character/graphics extracting unit.

According to the above aspect, a method of deciding the same shape can also cover characters and graphics that are partly in the same shape. Therefore, it is possible to correctly identify the data sheets even if characters ad graphics have been partly damaged or lost due to the deterioration of the image.

Further, according to a sixth aspect of the invention, there is provided a data sheet identification device of any one of the first to fifth aspects, the data sheet identification device further comprising: ruled-line extracting unit (corresponding to a ruled-line extracting section 170 in the first embodiment to be described later) for extracting ruled lines from the image information; and ruled-line collating unit (corresponding to a ruled-line collating section 180 in the first embodiment to be described later) for collating ruled-lines that have been extracted by the ruled-line extracting unit with a ruled-line database in which a plurality of ruled lines showing features of a plurality of data sheets respectively have been registered, wherein the identifying unit uniquely identifies the data sheets based on a result of the collation by the graphic collating unit, a result of the collation by the character collating unit, and a result of the collation by the ruled-line collating unit.

According to the above aspect, data sheets are identified by also taking into account a result of the collation relating to ruled lines. Therefore, it is possible to correctly identify data sheets based on a result of the collation relating to ruled lines even if it is not possible to identify the data sheets based on a result of the collation relating to characters and graphics.

Further, according to a seventh aspect of the invention, there is provided a data sheet identification device of the sixth aspect, the data sheet identification device further comprising: plane information extracting unit (corresponding to a plane extracting section 200 in the first embodiment to be described later) for extracting plane information including at least a filled area and a meshed area from the image information; and plane information collating unit (corresponding to a plane collating section 210 in the first embodiment to be described later) for collating plane information that has been extracted by the plane information extracting unit with plane information database in which a plurality of pieces of plane information showing features of a plurality of data sheets respectively have been registered, wherein the identifying unit uniquely identifies the data sheets based on a result of the collation by the graphic collating unit, a result of the collation by the character collating unit, a result of the collation by the ruled-line collating unit, and a result of the collation by the plane information collating unit.

According to the above aspect, data sheets are identified by also taking into account a result of the collation relating to plane information. Therefore, it is possible to correctly identify data sheets based on a result of the collation relating to the plane information even if it is not possible to identify the data sheets based on a result of the collation relating to characters and graphics.

Further, according to an eighth aspect of the invention, there is provided a data sheet identification device of the sixth or seventh aspect, wherein the identifying unit selects one of a plurality of results of collation according to a predetermined priority order, and uniquely identifies the data sheets based on the selected result of the collation.

According to the above aspect, a priority order is applied to a plurality of results of collation, and the data sheets are uniquely identified from a result of the collation based on the priority order. Therefore, it is possible to increase the variation in identification of data sheets.

Further, according to a ninth aspect of the invention, there is provided a data sheet identification device of any one of the first to eighth aspects, wherein the graphic collating unit collates graphics that have been decided to have the same shape and position information of the graphics with a graphic database in which a plurality of graphics and position information of the graphics showing features of a plurality of data sheets respectively have been registered.

According to the above aspect, graphics are collated by also taking into account position information of graphics. Therefore, it is possible to avoid an erroneous identification of data sheets due to a difference in position.

Further, according to a tenth aspect of the invention, there is provided a data sheet identification device of any one of the first and third to ninth aspects, wherein the character collating unit collates characters that have been decided to have the same shape and position information of the characters with a character database in which a plurality of characters and position information of the characters showing features of a plurality of data sheets respectively have been registered.

According to the above aspect, characters are collated by also taking into account position information of characters. Therefore, it is possible to avoid an erroneous identification of data sheets due to a difference in position.

Further, according to an eleventh aspect of the invention, there is provided a data sheet identification device of any one of the first and third to tenth aspects, wherein the character collating unit collates characters that have been decided to have the same shape and font information of the characters with a character database in which a plurality of characters and font information of the characters showing features of a plurality of data sheets respectively have been registered.

According to the above aspect, characters are collated by also taking into account font information of characters. Therefore, it is possible to avoid an erroneous identification of data sheets due to a difference in font information.

Further, according to a twelfth aspect of the invention, there is provided a data sheet identification device of any one of the first to eleventh aspects, wherein the character/graphics extracting unit extracts from the image information a part pattern in which pixels constituting a straight line portion of a ruled line and pixels constituting the characters are connected, and separates the straight line portion from the characters based on the part pattern, thereby to extract the characters.

According to the above aspect, even if characters exist on a ruled line, only the characters are extracted without affecting the ruled line. Therefore, it is possible to further increase the identification precision of the data sheets.

Other objects and features of this invention will become understood from the following description with reference to the accompanying drawings.

BRIEF DESCRIPTION OF THE DRAWINGS

FIGS. 16A and 16B are diagrams for explaining effects of the first embodiment.

FIGS. 19A and 19B are diagrams for explaining the image adjustment processing in the first modification of the first embodiment.

FIGS. 21A to 21C are diagrams for explaining the second modification of the first embodiment.

FIGS. 35A to 35D are diagrams for explaining problems of a conventional data sheet identification device.

FIGS. 36A to 36C are diagrams for explaining problems of the conventional data sheet identification device.

DESCRIPTION OF THE PREFERRED EMBODIMENTS

A first embodiment and a second embodiment of a data sheet identification device relating to the present invention will be explained in detail with reference to the drawings.

Figure 1:
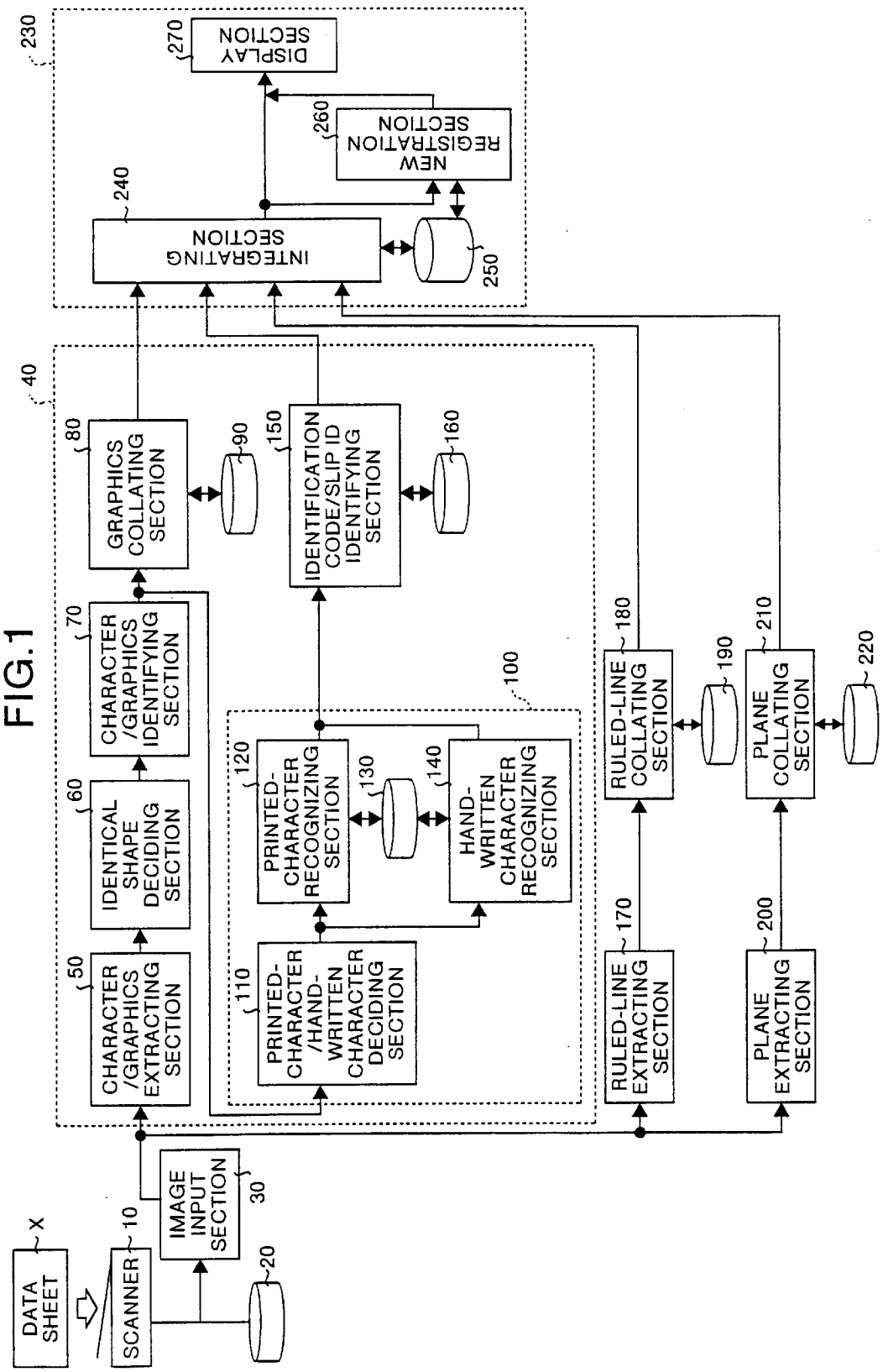
FIG. 1 is a block diagram showing a structure of a first embodiment relating to the present invention.

FIG. 1 is a block diagram showing a structure of a first embodiment relating to the present invention. In FIG. 1, a scanner 10 is a device for optically reading a data sheet X (reference FIG. 35A) in one line unit by a line scanning. An image input section 30 inputs image information from the scanner 10 and image information stored in a file 20.

A character/graphics analyzing section 40 analyzes elements (characters and graphics) printed on the data sheet X, based on the image information of the data sheet X. In the character/graphics analyzing section 40, a character/graphics extracting section 50 extracts character strings and graphic information from the image information that is input from the image input section 30. An identical shape deciding section 60 makes a decision as to whether or not there exist a plurality of character strings and graphics having the same shape in the character strings and graphics that have been extracted by the character/graphics extracting section 50.

A character/graphics identifying section 70 identifies based on a size and image density whether what has been extracted by the character/graphics extracting section 50 is a character or graphics. A graphics collating section 80 collates graphics that have been identified by the character/graphics identifying section 70 with a graphic dictionary database 90 (reference FIG. 4) consisting of registered graphics. The graphic dictionary database 90 shown in FIG. 4 consists of data sheet IDs F01 to F04 corresponding to registered graphics 91 to 94 respectively.

The registered graphics 91 to 94 are graphics that show features of data sheets and that have been registered in advance. The data sheet IDs F01 to F04 are given to four kinds of data sheets (not shown) to correspond to them respectively on which graphics same as the registered graphics 91 to 94 have been printed. Therefore, it is possible to uniquely specify the data sheets based on these data sheet IDs F01 to F04.

A character recognizing section 100 has a function of recognizing characters that have been identified by the character/graphics identifying section 70. A printed-character/hand-written character deciding section 110 makes a decision as to whether a character is a printed character or a hand-written character. A printed-character recognizing section 120 collates a printed character that has been decided by the printed-character/hand-written character deciding section 110 with a character dictionary database 130, and recognizes the printed character. A hand-written character recognizing section 140 collates a hand-written character decided by the printed-character/hand-written character deciding section 110 with the character dictionary database 130, and recognizes the hand-written character.

Figure 13:
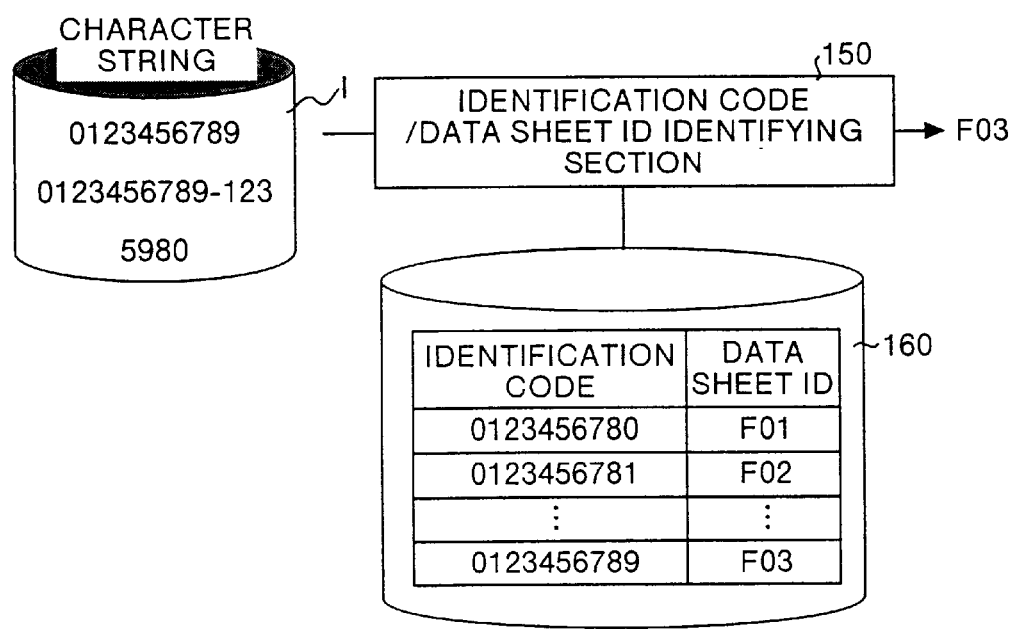
FIG. 13 is a diagram for explaining the operation of the identification code/data sheet ID identifying section 150 shown in FIG. 1.

An identification code/data sheet ID identifying section 150 collates a character string that has been recognized by the printed-character recognizing section 120 (or the hand-written character recognizing section 140) with an identification code/data sheet ID database 160 (reference FIG. 13). The identification code/data sheet ID database 160 shown in FIG. 13 includes identification codes prepared by character strings registered in advance and data sheet IDs. The identification codes are character strings that show features of data sheets. The data sheet IDs F01 to F04 are given corresponding to four kinds of data sheets (not shown) on which character strings same as four kinds of identification codes have been printed. These IDs are the same as the data sheet IDs shown in FIG. 4. Therefore, it is possible to uniquely specify data sheets based on these data sheet IDs F01 to F04.

A ruled-line extracting section 170 extracts ruled-line information from the image information that has been input from the image input section 30. A ruled-line collating section 180 collates ruled-line information that has been extracted from the ruled-line extracting section 170 with a ruled-line information database 190. The ruled-line information database 190 consists of ruled-line information printed on a plurality of kinds of data sheets that have been registered in advance. A plane extracting section 200 extracts a plane (a filled area, a meshed area, etc.) from the image information that has been input from the image input section 30. A plane collating section 210 collates a plane that has been extracted by the plane extracting section 200 with plane database 220.

An identifying section 230 finally identifies data sheets based on a result of a collation by the graphics collating section 80, a result of a collation by the identification code/data sheet ID identifying section 150, a result of a collation by the ruled-line collating section 180, and a result of a collation by the plane collating section 210 respectively. In the identifying section 230, an integrating section 240 integrates the result of a collation by the graphics collating section 80, the result of a collation by the identification code/data sheet ID identifying section 150, the result of a collation by the ruled-line collating section 180, and the result of a collation by the plane collating section 210 respectively. Then, the integrating section 240 finally identifies data sheets based on these results.

When a result of the identification by the integrating section 240 is new, a new registration section 260 registers identification information into an identification database 250. A display section 270 is a CRT (Cathode-Ray Tube) or a LCD (Liquid Crystal Display), and displays a result of identification of the data sheets and a result of reading the data sheets.

The operation of the first embodiment will be explained next. In FIG. 1, an operator sets the data sheet X (reference FIG. 35A) with the scanner 10. Then, the scanner 10 scans the data sheet X in one line unit, and optically reads the image of the data sheet X. A result of the reading by the scanner 10 is input to the image input section 30 as image information. The image input section 30 outputs the input image information to the character/graphics extracting section 50, the ruled-line extracting section 170 and the plane extracting section 200 in parallel.

Figure 2:
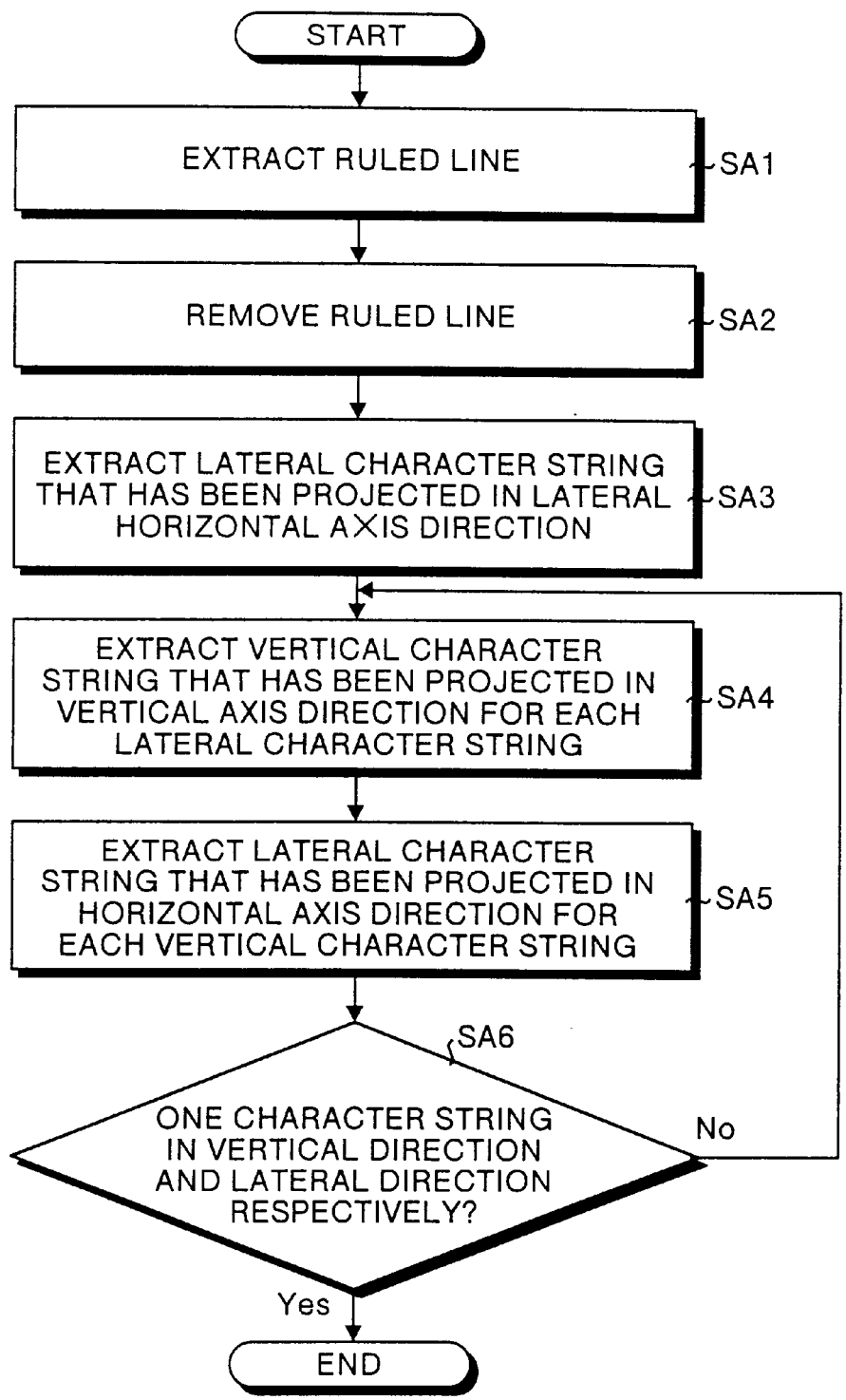
FIG. 2 is a flowchart for explaining the operation of a character/graphics extracting section 50 shown in FIG. 1.
Figure 3A:
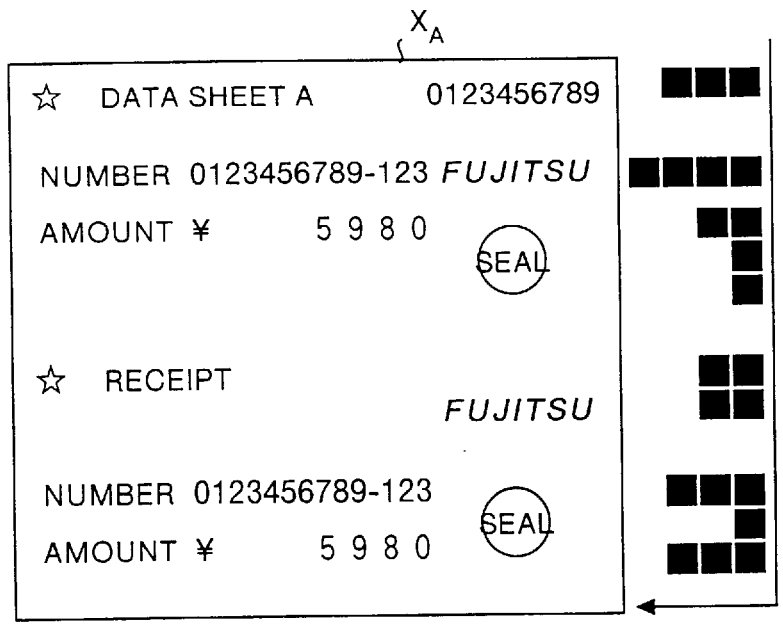
FIGS. 3A to 3G are diagrams for explaining the operation of the character/graphics extracting section 50 shown in FIG. 1.

Then, the character/graphics extracting section 50 operates according to a flowchart shown in FIG. 2. The character/graphics extracting section 50 extracts characters and graphics in a minimum square unit as shown in FIG. 3G from image information $X_A$ shown in FIG. 3A. In other words, at step SA1, the character/graphics extracting section 50 extracts ruled lines from the input image information (reference FIG. 35A). At step SA2, the character/graphics extracting section 50 removes the above ruled lines from the image information, and generates the image information $X_A$ shown in FIG. 3A. This image information $X_A$ is information corresponding to the characters (character strings) and graphics excluding the ruled lines of the data sheet X shown in FIG. 35A.

Figure 3B:
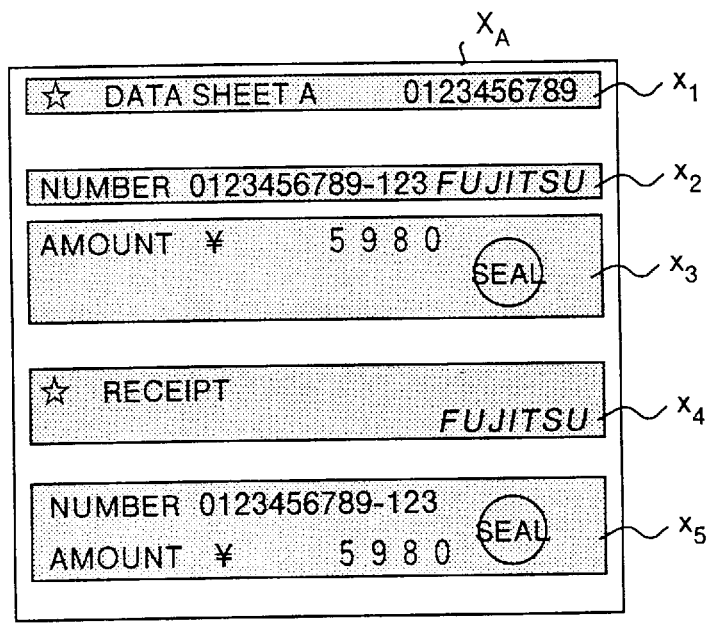

At step SA3, the character/graphics extracting section 50 extracts a lateral character string $x_1$ projected in a horizontal axis direction from the image information $X_A$ as shown by meshed lines in FIG. 3B. A single character, continuous characters, and graphics will be each called a character string in this case. At step SA4, the character/graphics extracting section 50 extracts vertical character strings projected in a vertical axis direction from each lateral character string (the lateral character string $x_1$ in this case) that has been extracted at step SA3.

Figure 3C:
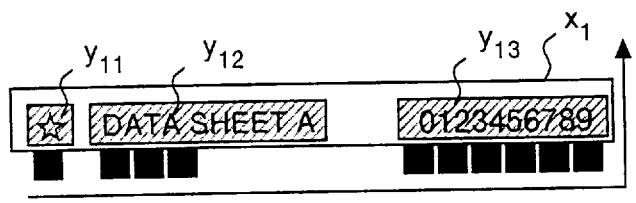

In this case, vertical character strings $y_{11}$, $y_{12}$ and $y_{13}$ shown in FIG. 3C are extracted. At step SA5, the character/graphics extracting section 50 extracts lateral character strings projected in a horizontal axis direction for each vertical character string (the vertical character strings $y_{11}$, $y_{12}$ and $y_{13}$) that has been extracted at step SA4. The projected lateral character strings are the same as the vertical character strings $y_{11}$, $y_{12}$ and $y_{13}$.

At step SA6, the character/graphics extracting section 50 makes a decision as to whether the number of string(s) in a horizontal axis direction and in a vertical axis direction in the minimum character string unit (each of the vertical character strings $y_{11}$, $y_{12}$ and $y_{13}$ and the same lateral character string) at this point of time is one string or not for the lateral character string $x_1$ (reference FIG. 3B). As the number of string(s) in each minimum character string unit is one, the character/graphics extracting section 50 makes a decision of "Yes", and finishes the processing of the lateral character string $x_1$.

Thereafter, the character/graphics extracting section 50 executes the processing at steps SA3 to SA6 for lateral character strings $x_2$ to $x_5$ shown in FIG. 3B. The processing for the lateral character string $x_5$ will be explained in detail next. At step SA3, the character/graphics extracting section 50 extracts the lateral character string $x_5$ projected in a horizontal axis direction from the image information $X_A$ as shown by meshed lines in FIG. 3B. At step SA4, the character/graphics extracting section 50 extracts vertical character strings projected in a vertical axis direction from the lateral character string $x_5$ that has been extracted at step SA3.

Figure 3D:
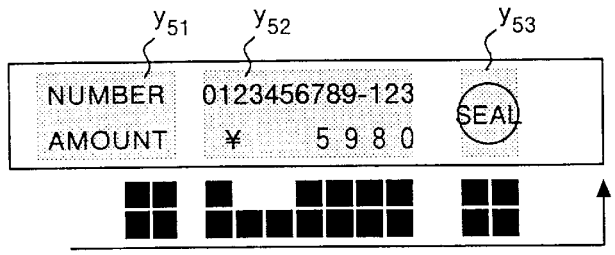
Figure 3E:
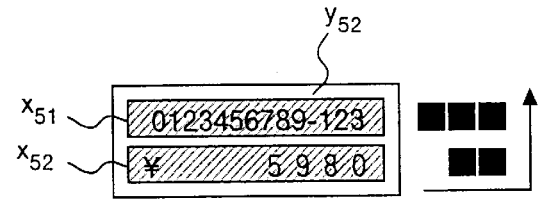

In this case, vertical character strings $y_{51}$, $y_{52}$ and $y_{53}$ shown in FIG. 3D are extracted. At step SA5, the character/graphics extracting section 50 extracts lateral character strings projected in a horizontal axis direction for each vertical character string (the vertical character strings $y_{51}$, $y_{52}$ and $y_{53}$) that has been extracted at step SA4. In the case of the vertical character string $y_{52}$, for example, lateral character strings $x_{51}$ and $x_{52}$ shown in FIG. 3E are extracted.

At step SA6, the character/graphics extracting section 50 makes a decision as to whether the number of string(s) in a horizontal axis direction and in a vertical axis direction in the minimum character string unit (the lateral character strings $x_{51}$ and $x_{52}$) at this point of time is one string or not for the lateral character string $x_5$ (reference FIG. 3B). As the number of string(s) in the vertical axis direction of the lateral character string $x_{52}$ is two ("Y" and "5980"), the character/graphics extracting section 50 makes a decision of "No".

Figure 3F:
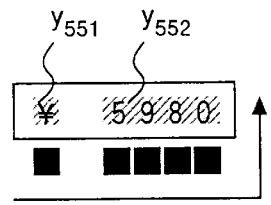
Figure 3G:
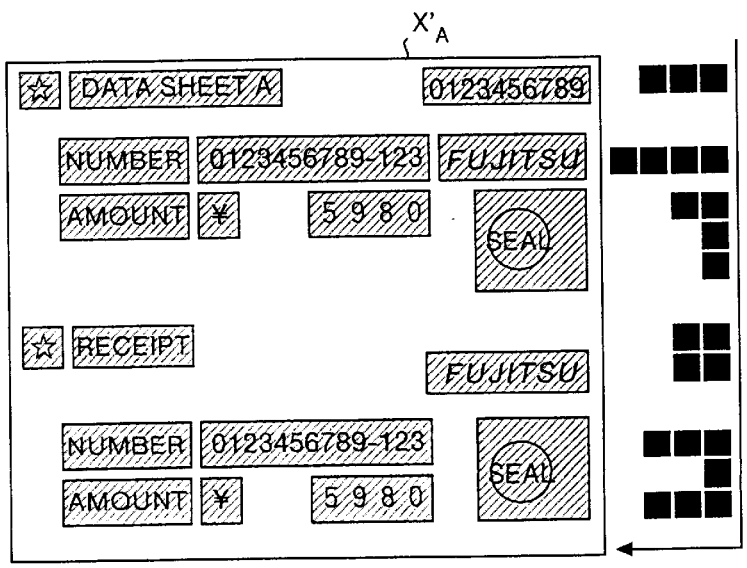

At step SA4, the character/graphics extracting section 50 extracts vertical character strings $y_{551}$ and $y_{552}$ projected in a vertical axis direction from the lateral character string $x_{52}$ that is shown in FIG. 3F. At step SA5, the character/graphics extracting section 50 extracts lateral character strings projected in a horizontal axis direction for each vertical character string (the vertical character strings $y_{155}$ and $y_{552}$) that has been extracted at step SA4. The projected lateral character strings are the same as the vertical character strings $y_{551}$ and $y_{552}$.

At step SA6, the character/graphics extracting section 50 makes a decision as to whether the number of string(s) in a horizontal axis direction and in a vertical axis direction in the minimum character string unit (the vertical character strings $y_{551}$ and $y_{552}$) at this point of time is one string or not for the lateral character string $x_5$ (reference FIG. 3B). As the number of string(s) is one for each minimum character string unit, the character/graphics extracting section 50 makes a decision of "Yes", and finishes the processing of the lateral character string $x_5$. As a result, nineteen characters and graphics in total in the minimum character string unit are extracted as shown by meshed lines in FIG. 3G. The character/graphics extracting section 50 delivers the result of the extraction to the identical shape deciding section 60.

Figure 5:
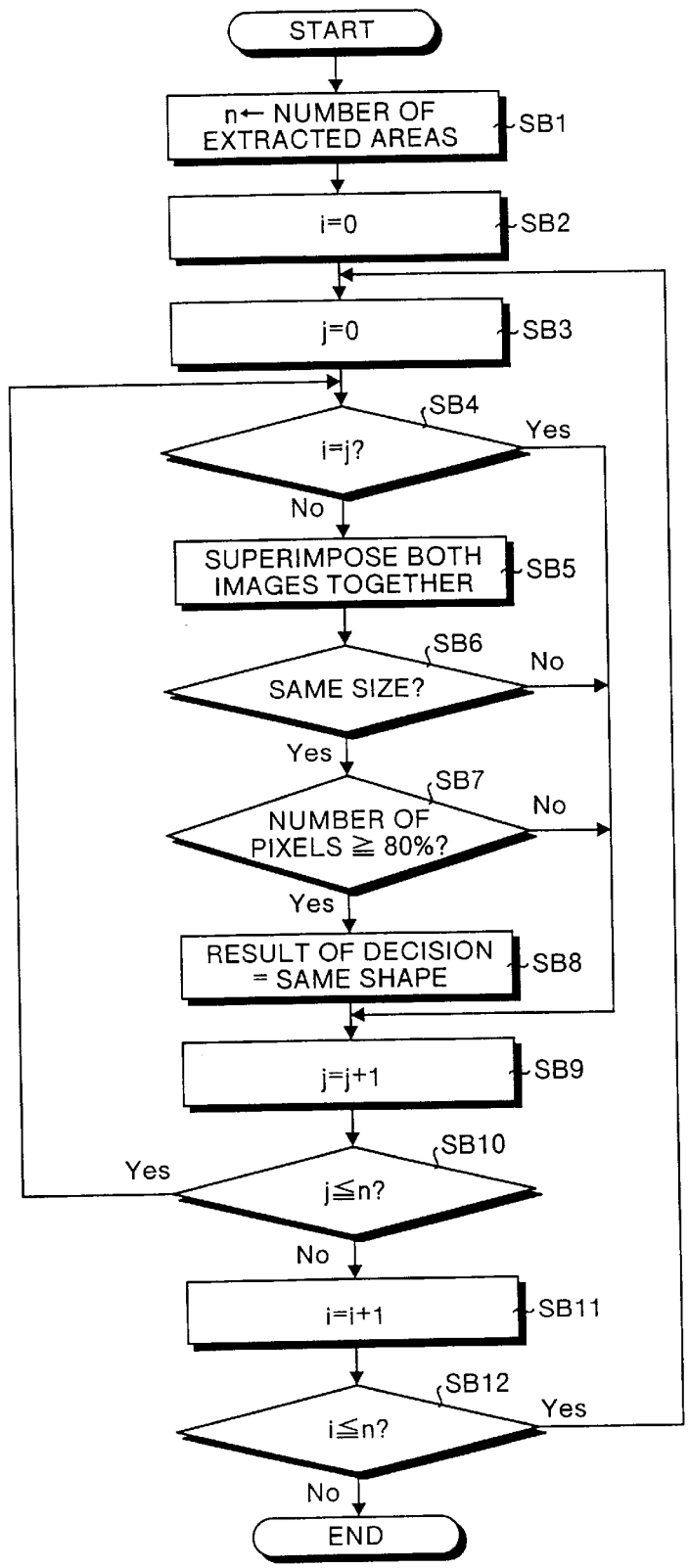
FIG. 5 is a flowchart for explaining the operation of an identical shape deciding section 60 shown in FIG. 1.
Figure 6:
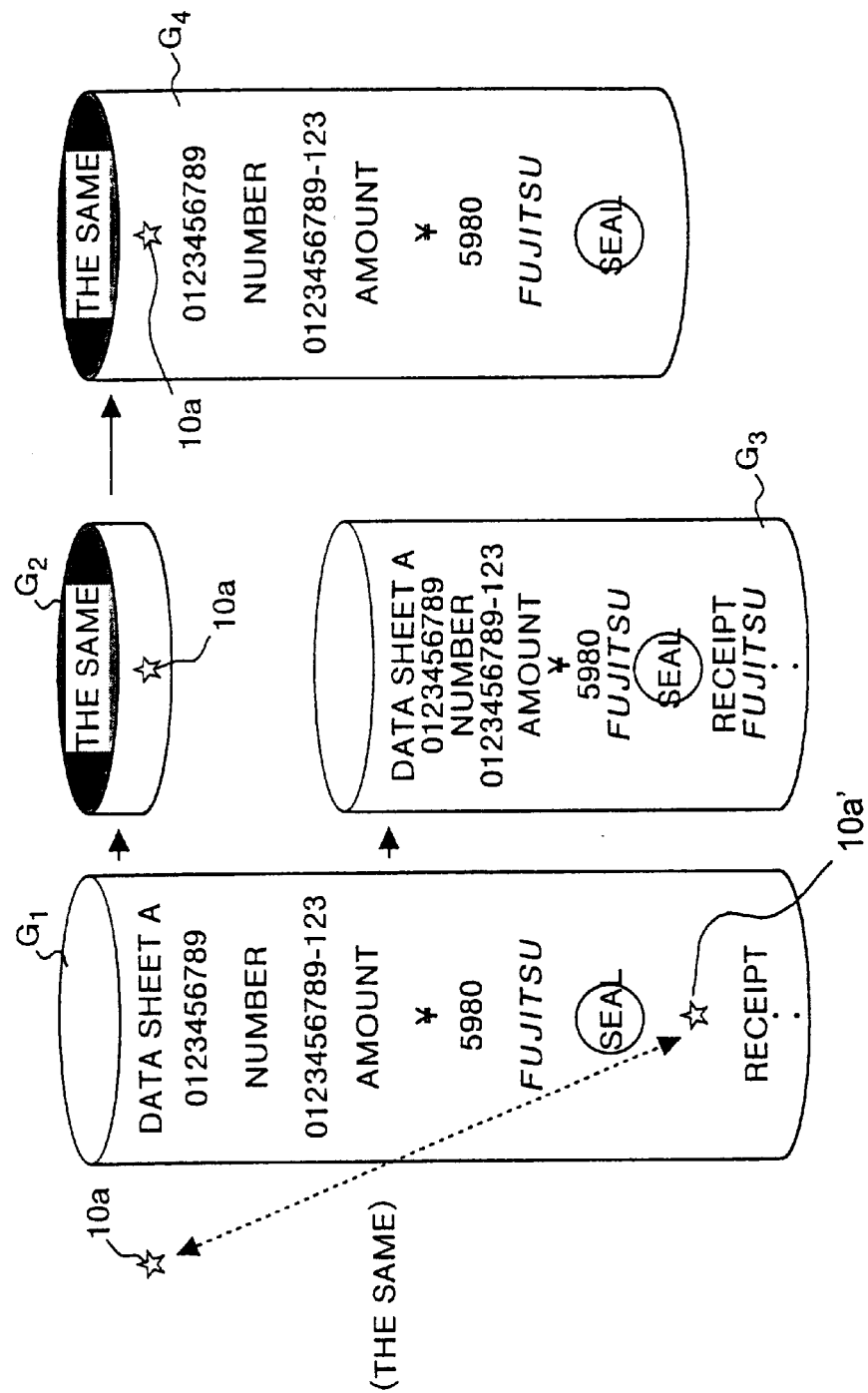
FIG. 6 is a diagram for explaining the operation of the identical shape deciding section 60 shown in FIG. 1.

Then, the identical shape deciding section 60 operates according to a flowchart shown in FIG. 5. In the following operation, the identical shape deciding section 60 makes a decision on characters and graphics that have the same shape among the nineteen characters and graphics in total (reference FIG. 3G) that have been extracted by the character/graphics extracting section 50. In other words, at step SB1 shown in FIG. 5, the identical shape deciding section 60 substitutes the number of extracted areas into n. The number of extracted areas is the number of character strings and graphics (=19) that have been extracted by the character/graphics extracting section 50. Referring to FIG. 6, a group $G_1$ represents a set of the nineteen character strings and graphics that have been extracted by the character/graphics extracting section 50.

At step SB2, the identical shape deciding section 60 substitutes 0 into a variable i. This variable i represents a target out of the nineteen character strings and graphics. It is assumed that the target corresponding to the variable i (=0) is a graphics 10a shown in FIG. 6. At step SB3, the identical shape deciding section 60 substitutes 0 into a variable j. This variable j represents the nineteen character strings and graphics. In this case, the variable j (=0) corresponds to the graphics 10a.

At step SB4, the identical shape deciding section 60 makes a decision as to whether the variable i (=0) and the variable j (=0) coincide with each other or not. The identical shape deciding section 60 makes a decision of "Yes". At step SB9, the identical shape deciding section 60 increments the variable j by one to "1". The variable j (=1) represents a character string "data sheet A" that is next to the graphics 10a within the group $G_1$ shown in FIG. 6. At step SB10, the identical shape deciding section 60 makes a decision as to whether the variable j (=1) is equal to or less than the number of extracted areas n (=19) or not. In this case, the identical shape deciding section 60 sets "Yes" as a result of the decision.

At step SB4, the identical shape deciding section 60 makes a decision as to whether the variable i (=0) and the variable j (=1) coincide with each other or not. The identical shape deciding section 60 makes a decision of "No". At step SB5, the identical shape deciding section 60 superimposes the graphics 10a corresponding to the variable i (=0) with the character string "data sheet A" corresponding to the variable j (=1). At step SB6, the identical shape deciding section 60 makes a decision as to whether both have the same sizes or not. In this case, the identical shape deciding section 60 sets "No" as a result of the decision. Then, the character string "data sheet A" corresponding to the variable j (=1) is input to a group $G_3$ shown in FIG. 6. This group $G_3$ is a set of graphics and characters of which shapes are different from that of the target.

At step SB9, the identical shape deciding section 60 increments the variable j by one to "2". The variable j (=2) represents a character string "0123456789" that is next to the "data sheet A" within the group $G_1$ shown in FIG. 6. At step SB10, the identical shape deciding section 60 makes a decision as to whether the variable j (=2) is equal to or less than the number of extracted areas n (=19) or not. In this case, the identical shape deciding section 60 sets "Yes" as a result of the decision. At step SB4, the identical shape deciding section 60 makes a decision as to whether the variable i (=0) and the variable j (=2) coincide with each other or not. The identical shape deciding section 60 makes a decision of "No".

At step SB5, the identical shape deciding section 60 superimposes the graphics 10a corresponding to the variable i (=0) with the character string "0123456789" corresponding to the variable j (=2). At step SB6, the identical shape deciding section 60 makes a decision as to whether both have the same sizes or not. In this case, the identical shape deciding section 60 sets "No" as a result of the decision. Then, the character string "0123456789" corresponding to the variable j (=2) is input to the group $G_3$ shown in FIG. 6. At step SB9, the identical shape deciding section 60 increments the variable j by one to "3". At step SB10, the identical shape deciding section 60 makes a decision as to whether the variable j (=3) is equal to or less than the number of extracted areas n (=19) or not. In this case, the identical shape deciding section 60 sets "Yes" as a result of the decision.

The above operation is repeated, and the graphics 10a (target) corresponding to the variable i (=0) is sequentially compared with the graphics and characters within the group $G_1$ corresponding to the variable j (=3) afterwards. Then, when the target graphics 10a and graphics 10a' having the same shape as the graphics 10a within the group $G_1$ are superimposed with each other at step SB5, the identical shape deciding section 60 sets "Yes" as a result of the decision made at step SB6.

At step SB7, the identical shape deciding section 60 makes a decision as to whether the number of pixels of the superimposed portion is 80% or more of the number of pixels of the target graphics 10a. Then identical shape deciding section 60 sets "Yes" as a result of the decision. Then, the graphics 10a is input to a group $G_2$ shown in FIG. 6. When the number of pixels of the superimposed portion is less than 80% of pixels of the target graphics 10a, a decision is made that the shape of the target does not coincide with the shape of the object compared. Then, the identical shape deciding section 60 sets "No" as a result of the decision made at step SB7. Thereafter, the above operation is repeated.

When a result of a decision made at step SB10 has become "No", the identical shape deciding section 60 inputs the graphics 10a within the group $G_2$ shown in FIG. 6 into a group $G_4$. At step SB11, the identical shape deciding section 60 increments the variable i by one to "1". The variable i (=1) represents the target character string "data sheet A" that is next to the graphics 10a within the group $G_1$.

At step SB12, the identical shape deciding section 60 makes a decision as to whether the variable i (=1) is equal to or less than the number of extracted areas n (=19) or not. In this case, the identical shape deciding section 60 sets "Yes" as a result of the decision. Thus, at step SB3 and afterwards, the processing is carried out using the character string "data sheet A" as a target. When the variable i has exceeded the number of extracted areas n, the identical shape deciding section 60 sets "No" as a result of the decision made at step SB12. Then, the identical shape deciding section 60 delivers nine characters and graphics (same shape group $G_4$) as a result of the decision to the character/graphics identifying section 70, and finishes the series of the processing.

Figure 7:
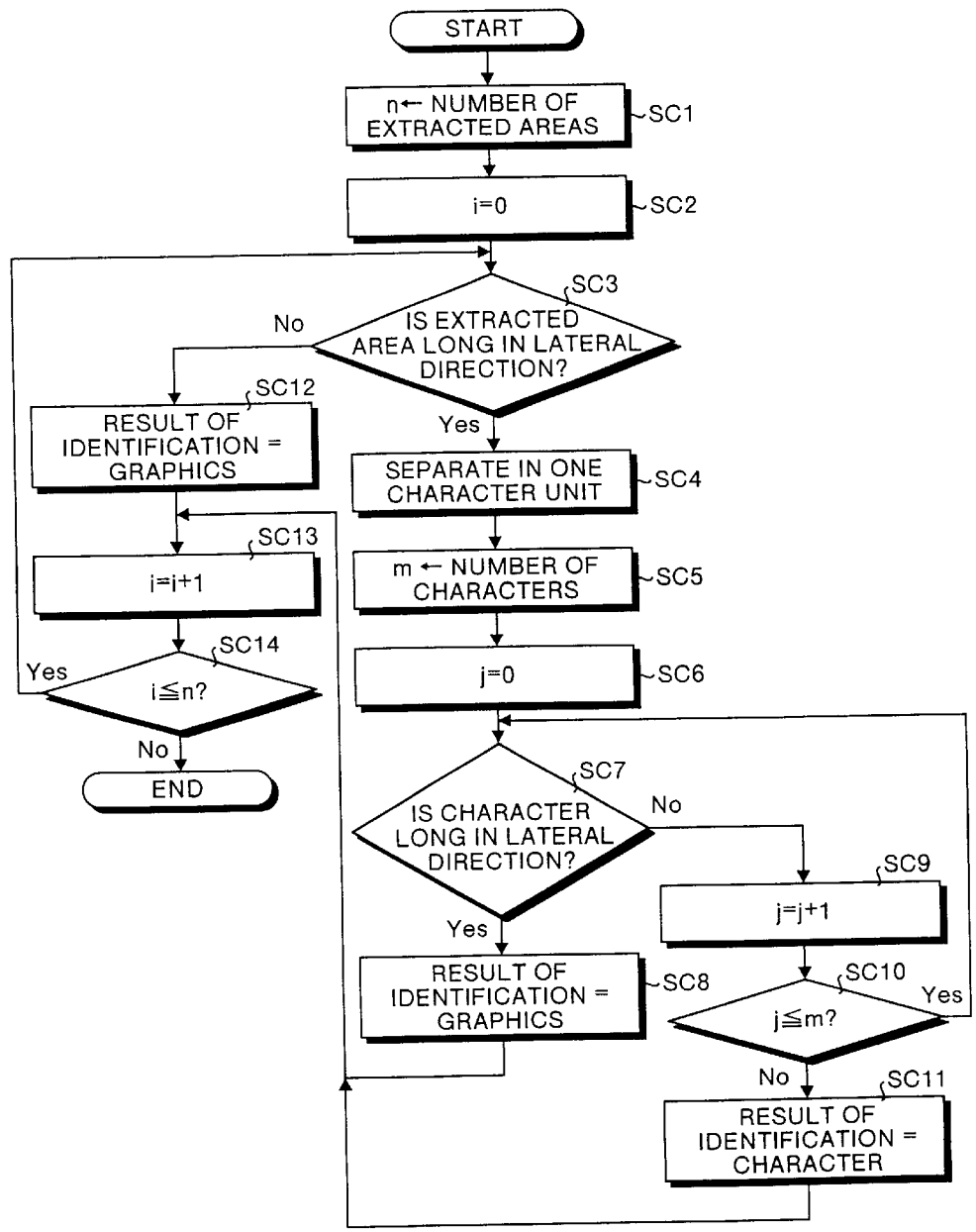
FIG. 7 is a flowchart for explaining the operation of a character/graphics identifying section 70 shown in FIG. 1.

The character/graphics identifying section 70 operates according to a flowchart shown in FIG. 7. In this operation, characters and graphics are discriminated in a group $H_1$ of the same shape shown in FIG. 8. The same shape group $H_1$ is the same as the same shape group $G_4$. At step SC1, the character/graphics identifying section 70 substitutes the number of extracted areas into n. The number of extracted areas n is the number of characters and graphics (=9) within the same shape group $H_1$ shown in FIG. 8.

At step SC2, the character/graphics identifying section 70 substitutes 0 into a variable i. This variable i represents a target out of the nine characters and graphics within the same shape group $H_1$ shown in FIG. 8. It is assumed that the target corresponding to the variable i (=0) is the graphics 10a. At step SC3, the character/graphics identifying section 70 makes a decision as to whether the extracted area of the graphics 10a (a regular square in this case) corresponding to the variable i (=1) is a laterally long rectangular shape or not. The character/graphics identifying section 70 sets "No" as a result of the decision made.

At step SC12, the character/graphics identifying section 70 identifies the target (graphics 10a) corresponding to the variable i (=0) as graphics, and inputs the graphics 10a into a group $H_2$, and then inputs the graphics 10a into a graphic group $H_3$. The graphic group $H_3$ is a set of graphics that have been identified as graphics in the same shape group $H_1$. At step SC13, the character/graphics identifying section 70 increments the variable i by one to "1". Thus, the target is set as the character string "0123456789" within the same shape group $H_1$ shown in FIG. 8. At step SC14, the character/graphics identifying section 70 makes a decision as to whether the variable i (=1) is equal to or less than the extracted number of areas n (=9). The character/graphics identifying section 70 sets "Yes" as a result of the decision made.

At step SC3, the character/graphics identifying section 70 makes a decision as to whether the target character string "0123456789" corresponding to the variable i (=1) is a laterally long rectangular shape or not. The character/graphics identifying section 70 sets "Yes" as a result of the decision made, and inputs the target character string "0123456789" into a group $H_6$ shown in FIG. 8. At step SC4, the character/graphics identifying section 70 separates the character string "0123456789" in one unit (reference the group $H_4$ in FIG. 8).

At step SC5, the character/graphics identifying section 70 substitutes the number (=10) of characters of the character string "0123456789" into m. At step SC6, the character/graphics identifying section 70 substitutes 0 into the variable j. This variable j is for specifying each one character separated at step SC5. In this case, the variable j (=0) represents the character "0" of the character string "0123456789". At step SC7, the character/graphics identifying section 70 makes a decision as to whether the character "0" corresponding to the variable j (=0) is a laterally long rectangular shape or not. The character/graphics identifying section 70 sets "No" as a result of the decision made. When a result of the decision made at step SC7 is "Yes", the character/graphics identifying section 70 makes a decision that the identified result is graphics at step SC8.

At step SC9, the character/graphics identifying section 70 increments the variable j by one to "1". The variable j (=1) represents a character "1" that is next to the character "0". At step SC10, the character/graphics identifying section 70 makes a decision as to whether the variable j (=1) is equal to or less than the number of characters m (=10) or not. In this case, the character/graphics identifying section 70 sets "Yes" as a result of the decision. Thereafter, the above operation is repeated. When a result of a decision made at step SC10 is "No", the character/graphics identifying section 70 identifies the character string "0123456789" as a character at step SC11, and inputs the character string "0123456789" into a character group $H_5$ shown in FIG. 8.

The character group $H_5$ is a set of characters that have been decided as characters within the same shape group $H_1$. At step SC13, the character/graphics identifying section 70 increments the variable i by one to "2". Thus, the target is set as a character string "number" within the same shape group $H_1$ shown in FIG. 8.

At step SC14, the character/graphics identifying section 70 makes a decision as to whether the variable i (=2) is equal to or less than the number of extracted areas n (=9) or not. In this case, the character/graphics identifying section 70 sets "Yes" as a result of the decision. Then, at step SC3 and afterwards, the above operation is repeated. When the variable i has exceeded the number of extracted areas n, the character/graphics identifying section 70 sets "No" as a result of the decision made at step SC14. Then, out of the identification results (the graphic group $H_3$ and the character group $H_5$), the character/graphics identifying section 70 delivers the graphic group $H_3$ to a graphics collating section 80 and, at the same time, delivers the character group $H_5$ to a printed-character/hand-written character deciding section 110 in the character recognizing section 100, and finishes the series of the processing.

Figure 9:
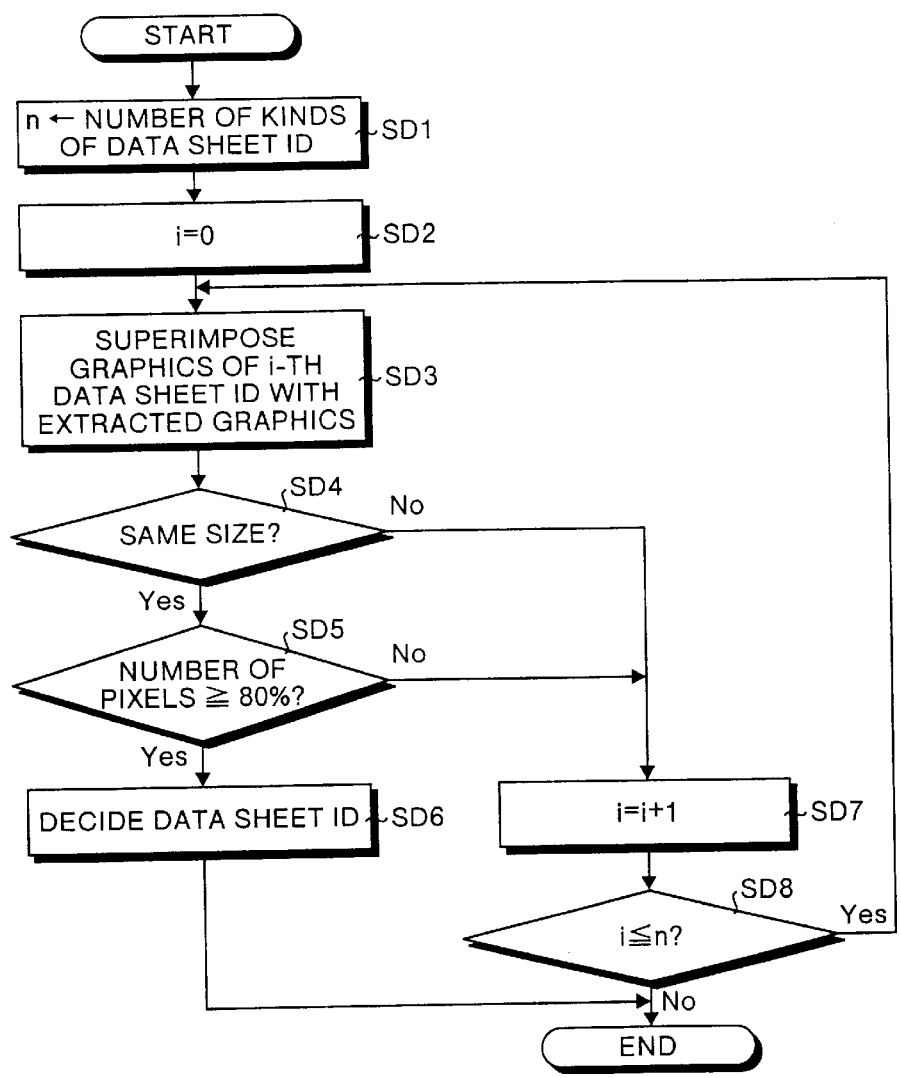
FIG. 9 is a flowchart for explaining the operation of a graphics collating section 80 shown in FIG. 1.

Next, the graphics collating section 80 operates according to a flowchart shown in FIG. 9. At step SD1, the graphics collating section 80 makes access to the graphic dictionary database 90 shown in FIG. 4, and substitutes the number of kinds (=4) of the data sheet IDs F01 to F04 shown in FIG. 4 into n. At step SD2, the graphics collating section 80 substitutes 0 into a variable i. This variable i represents a target out of registered graphics 91 to 94 corresponding to the data sheet IDs F01 to F04. It is assumed that the registered graphics 91 is a target corresponding to the variable i (=0).

Figure 8:
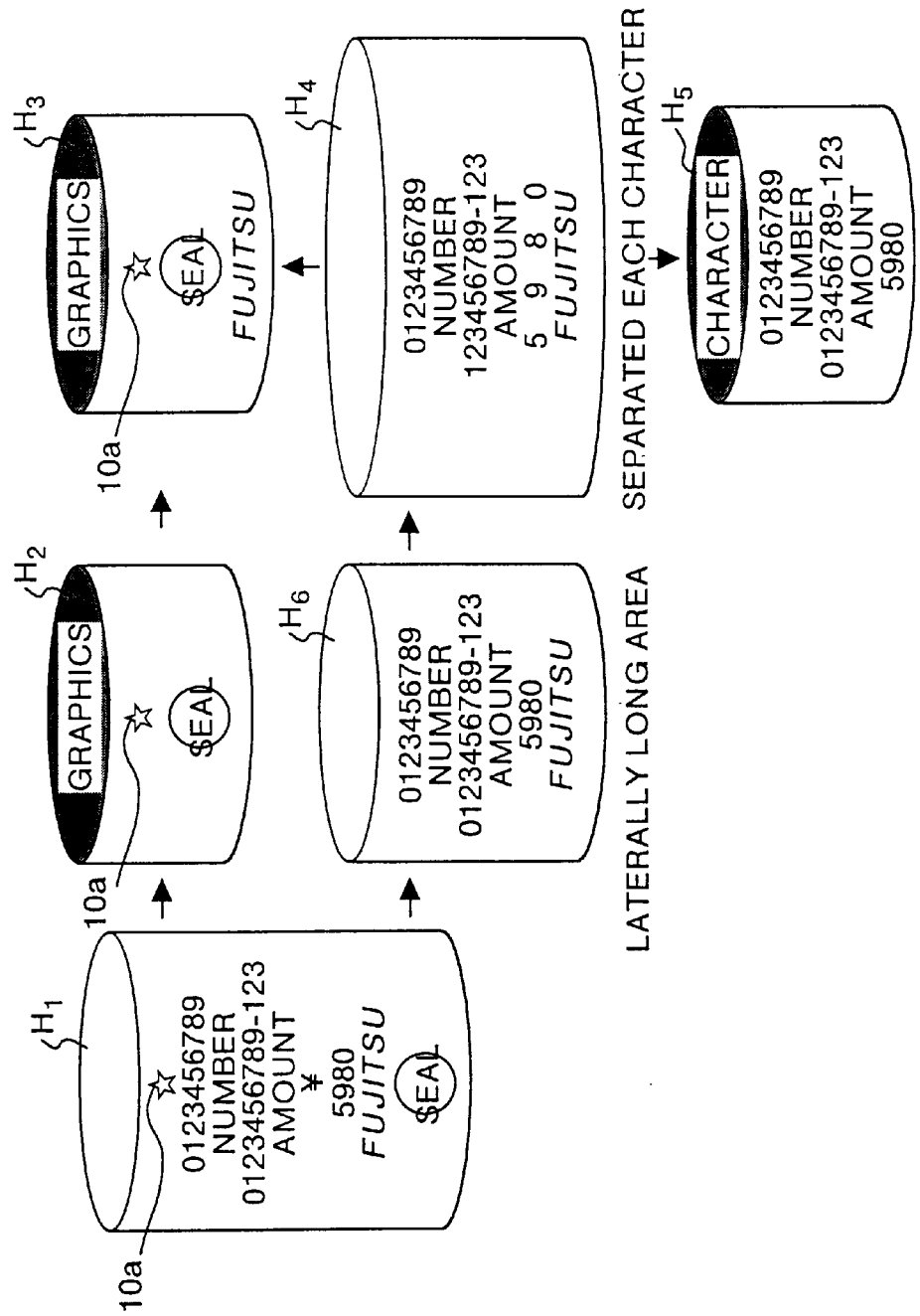
FIG. 8 is a diagram for explaining the operation of the character/graphics identifying section 70 shown in FIG. 1.

At step SD3, the graphics collating section 80 sequentially superimposes the registered graphics 91 corresponding to the variable i (=0) with graphics 10a, 11a and 12a within the graphic group $H_3$ (reference FIG. 8). At step SD4, the graphics collating section 80 makes a decision as to whether both are in the same size or not. The graphics collating section 80 sets "No" as a result of the decision made at step SD4. At step SD7, the graphics collating section 80 increments the variable i by one to "1". In this case, the variable i (=1) represents the registered graphics 92 shown in FIG. 4. At step SD8, the graphics collating section 80 makes a decision as to whether the variable i (=1) is equal to or less than the number n (=4) of kinds of data sheet IDs or not. The graphics collating section 80 sets "Yes" as a result of the decision made at step SD8. Thereafter, the above operation is repeated.

When the variable i is equal to 2, at step SD3, the graphics collating section 80 sequentially superimposes the registered graphics 93 corresponding to the variable i (=2) with the graphics 10$a$, 11$a$ and 12$a$ within the graphic group $H_3$ (reference FIG. 8). At step SD4, the graphics collating section 80 makes a decision as to whether both are in the same size or not. The graphics collating section 80 sets "Yes" as the size of the registered graphics 93 and the size of the graphics 12$a$ are the same. At step SD5, the graphics collating section 80 makes a decision as to whether the number of pixels of the superimposed portion is 80% or more of the number of pixels of the target. The graphics collating section 80 sets "Yes" as a result of the decision made. At step SD6, the graphics collating section 80 makes firm the data sheet ID F03 corresponding to the registered graphics 93 as the data sheet ID. The graphics collating section 80 delivers the data sheet ID F03 and the graphic information corresponding to this to the integrating section 240 as a result of the collation. In other words, the data sheet ID F03 is a result of the data sheet identification based on the graphics.

When the character/graphics identifying section 70 has delivered the character group $H_5$ (reference FIG. 8) to the printed-character/hand-written character deciding section 110, the printed-character/hand-written character deciding section 110 discriminates between the printed characters and the hand-written characters that are included in the character group $H_5$. The printed-character/hand-written character deciding section 110 delivers printed characters that have been identified as the printed characters to the printed-character recognizing section 120 and, at the same time, delivers hand-written characters that have been identified as the hand-written characters to the hand-written character recognizing section 140.

The printed-character recognizing section 120 refers to the character dictionary database 130 and recognizes characters that have been decided as the printed characters by the printed-character/hand-written character deciding section 110. Similarly, the hand-written character recognizing section 140 recognizes characters that have been decided as the hand-written characters by the printed-character/hand-written character deciding section 110. A recognized character group I shown in FIG. 13 is a set of a part of character strings that have been recognized as characters.

Figure 12:
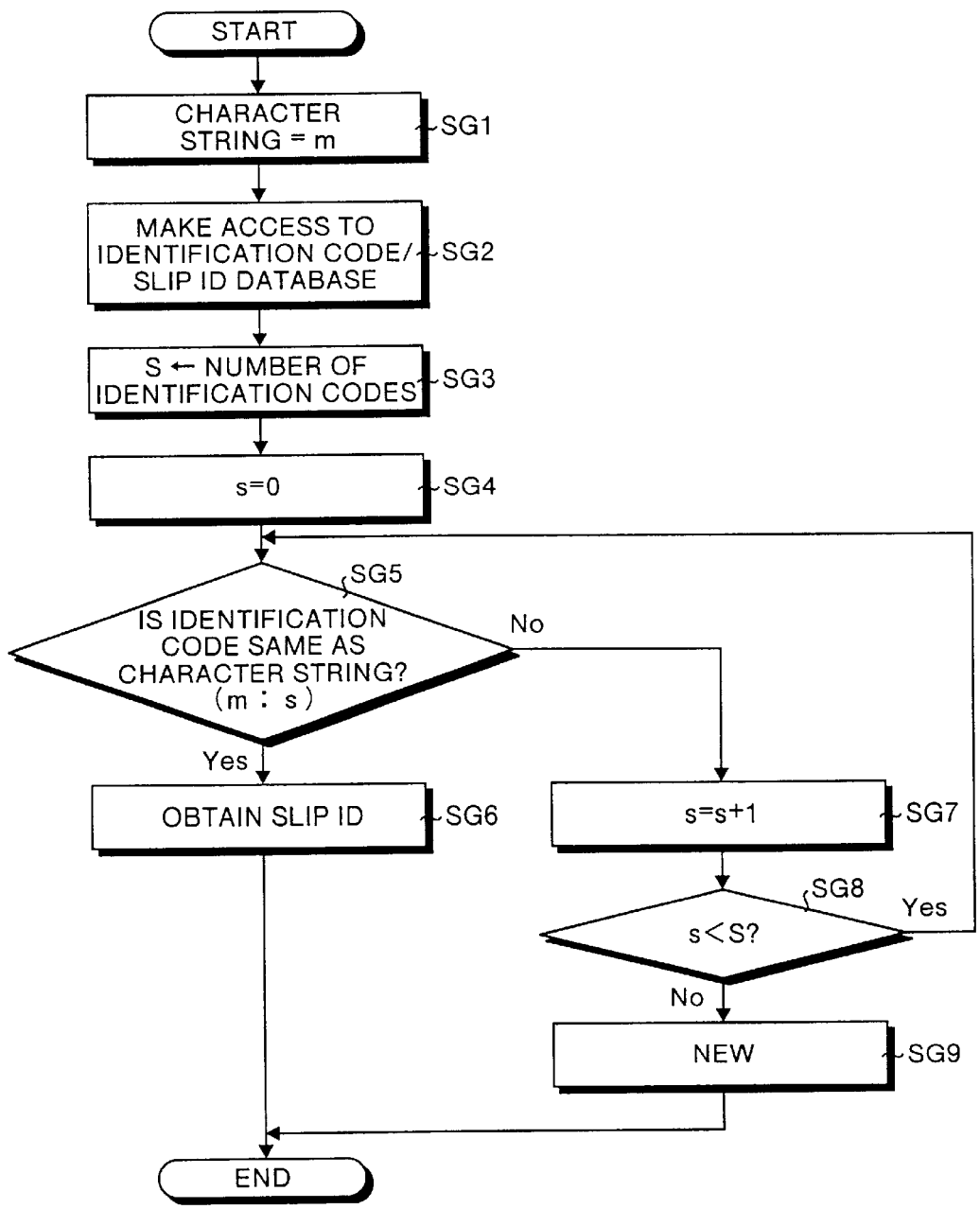
FIG. 12 is a flowchart for explaining the operation of an identification code/data sheet ID identifying section 150 shown in FIG. 1.

Based on the above arrangement, the identification code/data sheet ID identifying section 150 operates according to a flowchart shown in FIG. 12. At step SG1, the identification code/data sheet ID identifying section 150 sets a target character string out of the recognized character group I to m. At step SG2, the identification code/data sheet ID identifying section 150 makes access to the identification code/data sheet ID database 160 and reads the identification codes.

At step SG3, the identification code/data sheet ID identifying section 150 sets the number of identification codes to S. The number of identification codes is the number of identification codes within the identification code/data sheet ID database 160. At step SG4, the identification code/data sheet ID identifying section 150 substitutes 0 into a variable s. This variable s represents a target out of the character strings in the recognized character group I. It is assumed that the target corresponding to the variable s (=0) is the character string "0123456789" within the recognized character group I.

At step SG5, the identification code/data sheet ID identifying section 150 makes a decision as to whether or not there is an identification code (reference the identification code/data sheet ID database 160 in FIG. 13) that is the same as the character string "0123456789". In this case, the character string "0123456789" within the recognized character group I is the same as the identification code "0123456789" within the identification code/data sheet ID database 160. Therefore, the identification code/data sheet ID identifying section 150 sets "Yes" as a result of the decision made at step SG5.

At step SG6, the identification code/data sheet ID identifying section 150 obtains the data sheet ID F03 that corresponds to the identification code "0123456789" from the identification code/data sheet ID database 160, and delivers the data sheet ID F03 and the identification code "0123456789" to the integrating section 240. In other words, the data sheet ID F03 is a result of the data sheet identification based on characters.

When a result of the decision made at step SG5 is "No", the identification code/data sheet ID identifying section 150 increments the variable s by one at step SG7. Thus, the next target is assigned out of the character strings within the recognized character group I. At step SG8, the identification code/data sheet ID identifying section 150 makes a decision as to whether the variable s is less than the number of identification codes S or not. When a result of the decision made is "Yes", the processing at step SG5 and afterwards is repeated. When a result of the decision made at step SG8 is "No", the identification code/data sheet ID identifying section 150 makes a decision as to whether the target character string is new or not at step SG9.

In parallel with the above operation of the character/graphics analyzing section 40, the ruled-line extracting section 170 extracts ruled-line information from the image information that has been input from the image input section 30. Then, the ruled-line collating section 180 collates the ruled-line information with the ruled-line database 190, and makes a decision as to whether there exists ruled-line information that is the same as the ruled-line information within the ruled-line database 190 or not.

When there exist the same ruled-line information within the ruled-line database 190, the ruled-line collating section 180 obtains a data sheet ID that corresponds to the ruled-line information that is the same as the ruled-line information within the ruled-line database 190. Then, the ruled-line collating section 180 delivers this data sheet ID and the ruled-line information (the number of lateral ruled lines, the number of vertical ruled lines, and long or short of the ruled lines) to the integrating section 240. In other words, the data sheet ID from the ruled-line collating section 180 is a result of the collation based on ruled lines. As a result of the collation, when the ruled-line information is not the same as the ruled-line information within the ruled-line database 190, the ruled-line collating section 180 makes a decision that the ruled-line information from the ruled-line extracting section 170 is new.

Figure 10:
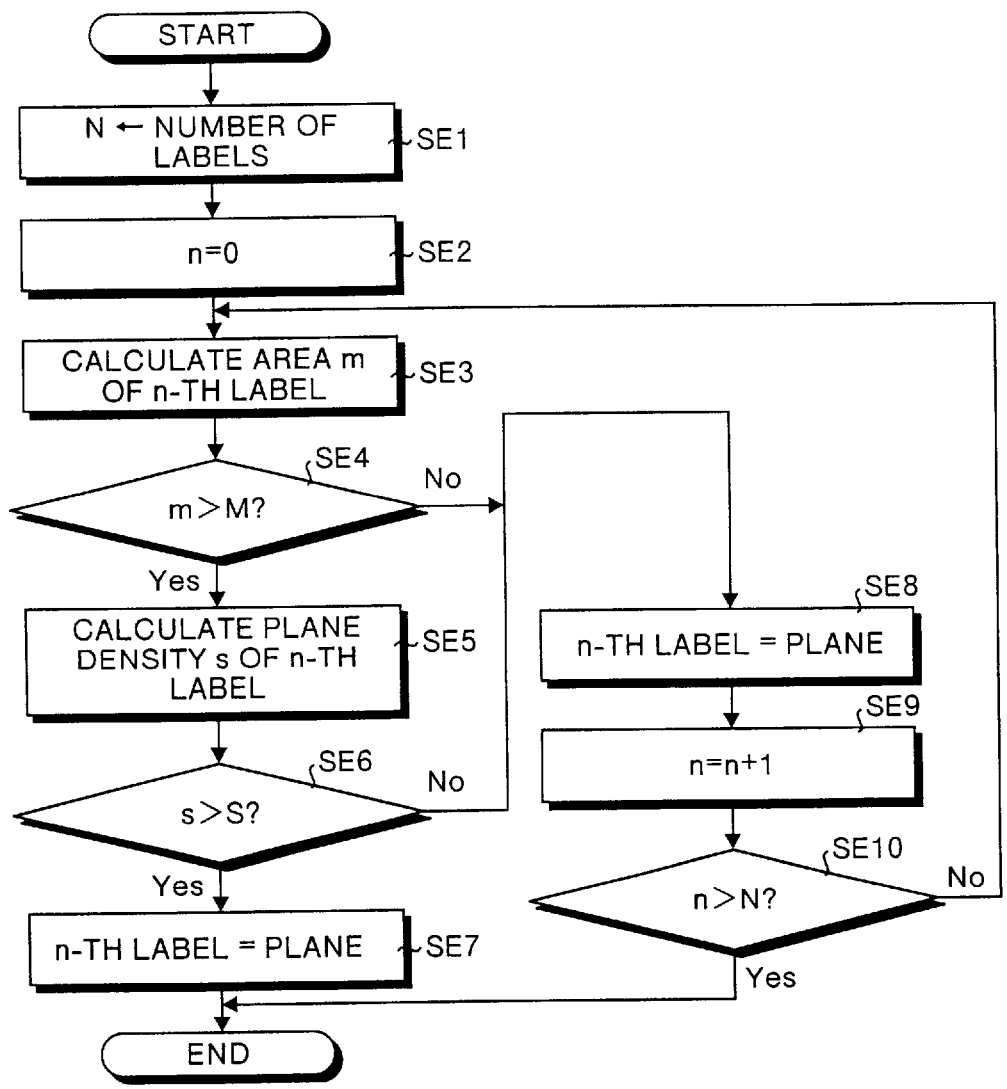
FIG. 10 is a flowchart for explaining the operation of a plane extracting section 200 shown in FIG. 1.

Further, in parallel with the operation of the character/graphics analyzing section 40 and the ruled-line extracting section 170, the plane extracting section 200 operates according to a flowchart shown in FIG. 10. At step SE1, the plane extracting section 200 takes out labels (planes) of filled areas and meshed areas from the image information that has been input by the image input section 30, and sets the number of these labels to a number of labels N. The label in this case refers to a block of pixels (connected elements) in each area or a monochrome image. At step SE2, the plane extracting section 200 substitutes 0 into a variable n. This variable n represents a target out of a plurality of labels.

At step SE3, the plane extracting section 200 calculates an area m of a label corresponding to the variable n (=0). At step SE4, the plane extracting section 200 makes a decision as to whether the area m has exceeded a pre-set area minimum value M or not. When a result of the decision made at step SE4 is "Yes", the plane extracting section 200 calculates a plane density s of the label corresponding to the variable n (=0) at step SE5.

At step SE6, the plane extracting section 200 makes a decision as to whether the plane density s has exceeded a pre-set plane density minimum value or not. When a result of the decision made at step SE6 is "Yes", the plane extracting section 200 decides at step SE7 that the n-th label corresponding to the variable n is a plane. Then, the plane extracting section 200 delivers plane information (a lateral size yy of the plane, a vertical size tt of the plane, and position information) of the plane information relating to this plane to the plane collating section 210. In other words, the n-th label has been extracted as a plane.

On the other hand, when a decision made at step SE4 is "No", the plane extracting section 200 decides at step SE8 that the n-th label corresponding to the variable n is not a plane. At step SE9, the plane extracting section 200 increments the variable n by one. At step SE10, the plane extracting section 200 makes a decision as to whether the variable n has exceeded the number of labels N or not. When a result of the decision made is "No", the processing at step SE3 and afterwards is executed. When a result of the decision made at step SE10 is "Yes", a series of processing is finished. When a result of the decision made at step SE6 is "No", the plane extracting section 200 executes the processing at step SE8.

Figure 11:
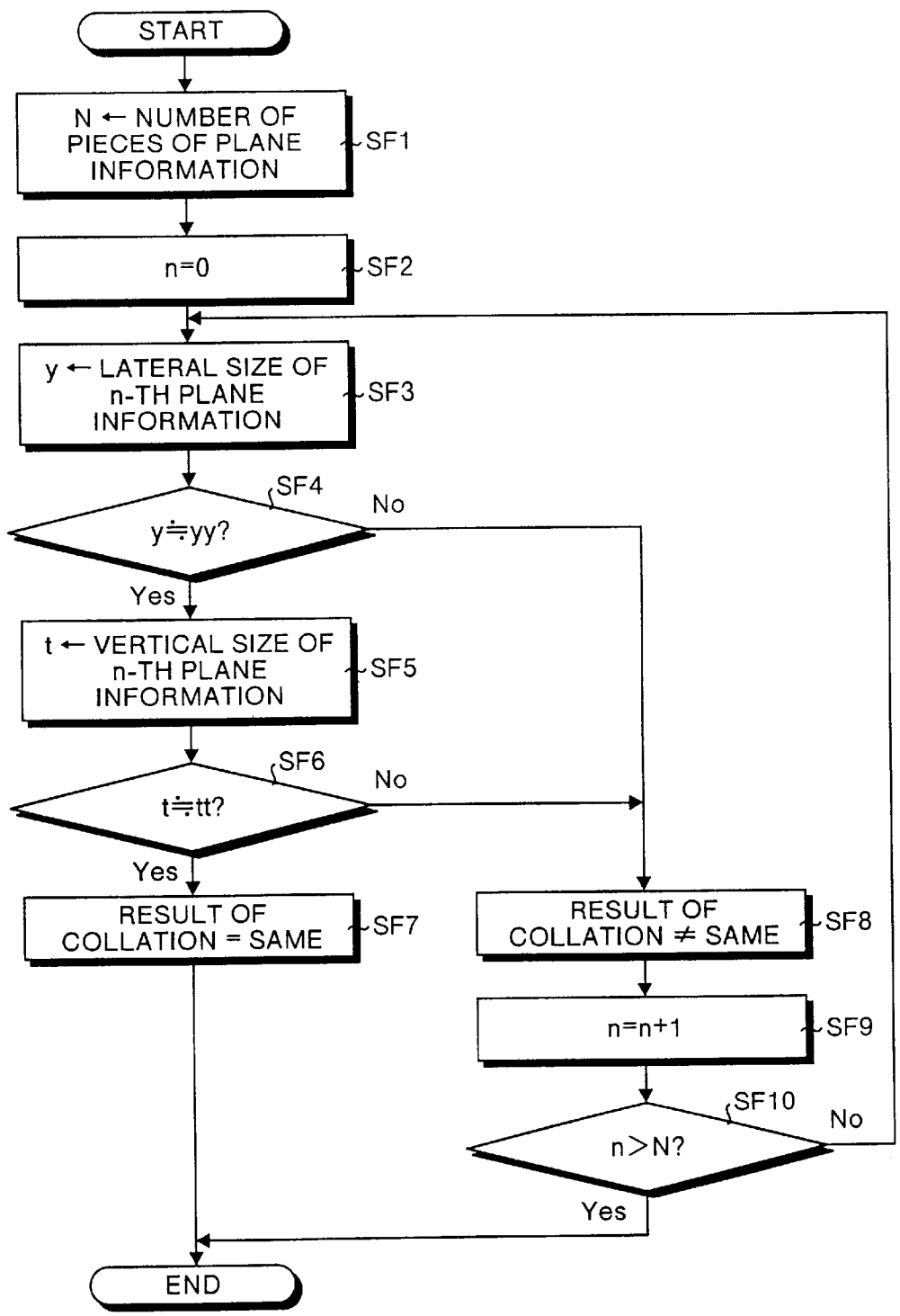
FIG. 11 is a flowchart for explaining the operation of a plane collating section 210 shown in FIG. 1.

Next, the plane collating section 210 operates according to a flowchart shown in FIG. 11. At step SF1, the plane collating section 210 sets a number of pieces of plane information within the plane database 220 to a number of pieces of plane information N. The plane database 220 consists of a plurality of data sheet IDs that are given to a plurality of kinds of data sheets, and plane information (a lateral size and a vertical size) corresponding to each of the plurality of data sheet IDs. This plane information is information that represents features (a filled area and a meshed area in this case) for identifying the data sheets.

At step SF2, the plane collating section 210 substitute 0 into a variable n. This variable n represents a target out of the plurality of pieces of plane information within the plane database 220. At step SF3, the plane collating section 210 sets the lateral size of the n-th plane information corresponding to the variable n (=0) to y. At step SF4, the plane collating section 210 makes a decision as to whether or not the lateral size y is approximately the same as the lateral size yy obtained from the plane information from the plane extracting section 200.

When a result of the decision made at step SF4 is "Yes", the plane collating section 210 sets a vertical size of the n-th plane information corresponding to the variable (=0) to t at step SF5. At step SF6, the plane collating section 210 makes a decision as to whether or not the vertical size t is approximately the same as the vertical size tt obtained from the plane information from the plane extracting section 200. When a result of the decision made at step SF6 is "Yes", the plane collating section 210 obtains at step SF7 the data sheet ID corresponding to the plane information within the plane database 220, and delivers this data sheet ID and the plane information (a vertical size, a lateral size and position information) to the integrating section 240. In other words, the data sheet ID from the plane collating section 210 is a result of the collation based on the plane information.

On the other hand, when a decision made at step SF4 is "No", the plane collating section 210 decides at step SF8 that the result of the collation is that the lateral size y is not approximately the same as the lateral size yy. At step SF9, the plane collating section 210 increments the variable n by one. At step SF10, the plane collating section 210 makes a decision as to whether the variable n has exceeded the number of pieces of plane information N or not. When a result of the decision made is "No", the processing at step SF3 and afterwards is executed. When a result of the decision made at step SF10 is "Yes", a series of processing is finished. When a result of the decision made at step SF6 is "No", the plane collating section 210 executes the processing at step SF8.

Four data sheet IDs are delivered to the integrating section 240 as a result of the data sheet identification from the graphics collating section 80, the identification code/data sheet ID identifying section 150, ruled-line collating section 180 and the plane collating section 210 respectively. Then, the integrating section 240 operates according to a flowchart shown in FIG. 14. At step SH1, the integrating section 240 makes a decision as to whether all of the four data sheet IDs are the same or not. The data sheet ID from the graphics collating section 80 is a result of identification based on graphics, and the data sheet ID from the identification code/data sheet ID identifying section 150 is a result of identification based on characters. Further, the data sheet ID from the ruled-line collating section 180 is a result of the collation based on ruled lines, and the data sheet ID from the plane collating section 210 is a result of the collation based on plane information.

When a result of the decision made at step SH1 is "Yes", the integrating section 240 decides that the four data sheet IDs (all are the same) are a final result of data sheet identification, and makes the display section 270 display this result. As the results of the four identifications are all the same, this result of data sheet identification has a highest reliability.

On the other hand, when a result of the decision made at step SH1 is "No", the integrating section 240 collates the four data sheet IDs with the identification database 250 at step SH2, and makes a decision as to whether all of the four data sheet IDs are new or not. The identification database 250 stores identification information having an information structure similar to that of identification information $D_t$ corresponding to a data sheet ID K04 shown in FIG. 15, for each data sheet ID. This identification information $D_t$ is information obtained from a data sheet $X_t$ for registration. The identification information $D_t$ consists of an identification code similar to the identification code from the graphics collating section 80 and the graphic dictionary database 90, plane information similar to the plane information (position information, a vertical size and a lateral size) from the plane collating section 210, and ruled-line information similar to the ruled-line information from the ruled-line collating section 180.

When a result of the decision made at step SH2 is "Yes", the new registration section 260 newly registers the identification information (reference the identification information $D_t$ in FIG. 15) into the identification database 250 at step SH5. The identification information includes a data sheet ID from the graphics collating section 80 and the identification code/data sheet ID identifying section 150, and graphic and character information corresponding to this data sheet ID. Further, the identification information includes a data sheet ID from the ruled-line collating section 180, and ruled-line information corresponding to this data sheet ID. Further, the identification information includes a data sheet ID from the plane collating section 210, and plane information (position information, a vertical size and a lateral size) corresponding to this data sheet ID.

On the other hand, when a result of the decision made at step SH2 is "No", the integrating section 240 collates the four data sheet IDs with the identification database 250 at step SH3, and makes a decision as to whether a part of the four data sheet IDs is new or not. When a result of the decision made at step SH3 is "Yes", the integrating section 240 makes a decision at step SH6 as to whether the new information is similar to the identification information relating to the data sheet registered in the identification database 250 or not. When a result of the decision made at step SH6 is "Yes", the integrating section 240 decides that the data sheet ID obtained from the identification information is a result of the data sheet identification, and makes the display unit 270 display this result.

On the other hand, when a result of the decision made at step SH3 or step SH6 is "No", the integrating section 240 decides that a result of the analysis by the character/graphics analyzing section 40 is a result of the data sheet identification at step SH4. In other words, the integrating section 240 decides that the data sheet ID from the graphics collating section 80 or the data sheet ID from the identification code/data sheet ID identifying section 150 is a result of the data sheet identification, and makes the display unit 270 display this result.

Figure 15:
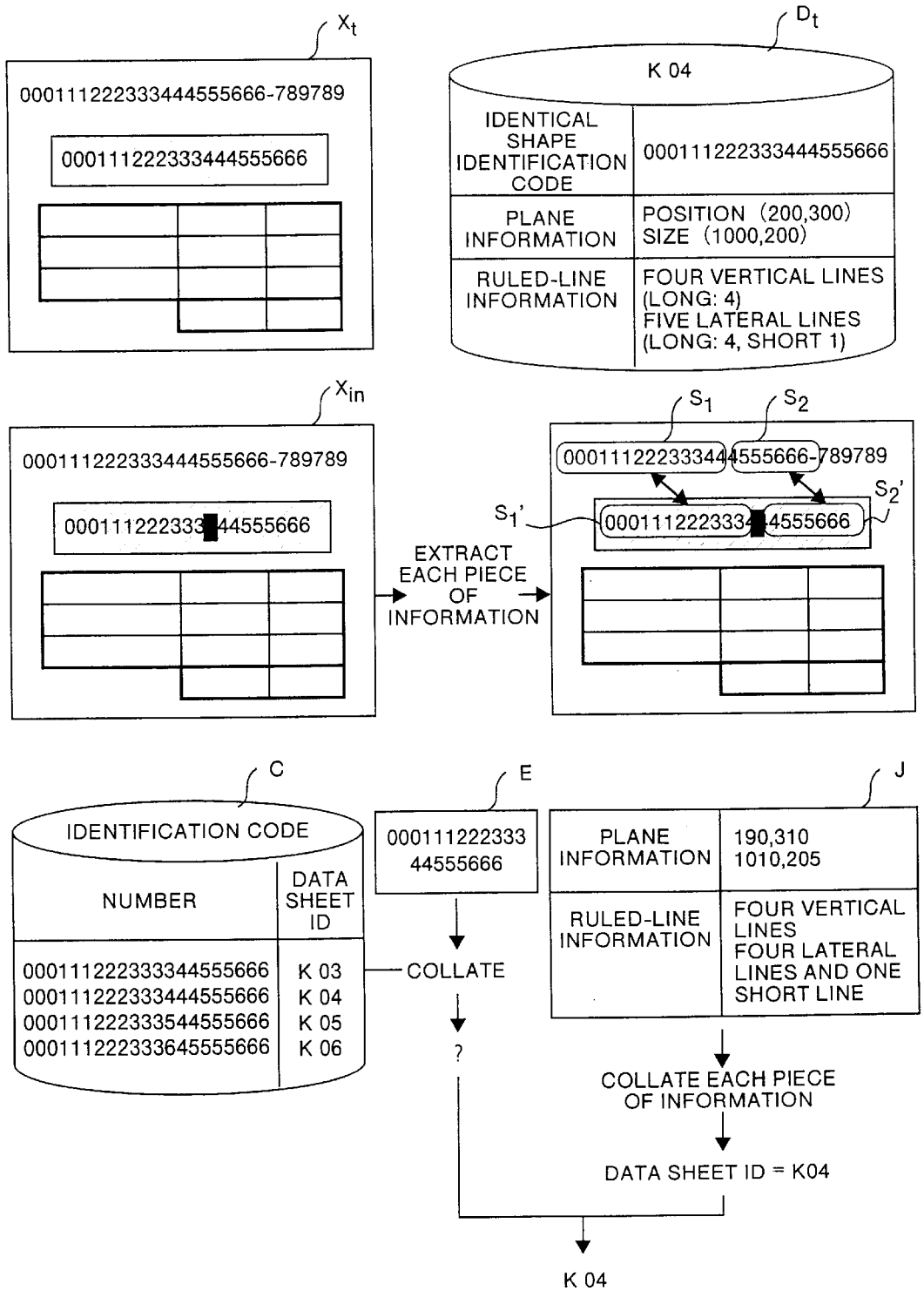
FIG. 15 is a diagram for explaining effects of the first embodiment.

FIG. 15 is a diagram for explaining effects of the first embodiment. It is assumed that in place of the data sheet X shown in FIG. 1, an image of a data sheet $X_{in}$ shown in FIG. 15 has been read by the scanner 10. In the data sheet $X_{in}$, one character out of an identification code of a meshed portion is filled in black, and this cannot be recognized by the character recognizing section 100. Therefore, identical shape deciding section 60 outputs "000111222333" (reference an oval $S_1$, an oval $S_1$') and "44555666" (reference an oval $S_2$, an oval $S_2$') as a result of the same shape decision E. When this result of the same shape decision E is collated with a database C as the character dictionary database 130, it is not possible to obtain a correct result of the collation because of this black-filled portion. Therefore, it is not possible to identify the data sheet.

However, the ruled-line information and the plane information (reference information J) are correctly obtained from the ruled-line extracting section 170 and the plane extracting section 200. Therefore, the ruled-line collating section 180 and the plane collating section 210 can obtain a data sheet ID K04 as a correct result of the collation. The integrating section 240 decides that the data sheet ID K04 is a final result of data sheet identification.

As explained above, according to the first embodiment, a final data sheet identification is carried out based on the results of the four collations including the result of the collation by the graphics collating section 80, the result of the collation by the identification code/data sheet ID identifying section 150, the result of the collation by the ruled-line collating section 180, and the result of the collation by plane collating section 210. Therefore, even if any one of the four collation results of a data sheet cannot be obtained correctly, it is possible to identify the data sheet based on the rest of the collation results.

Further, according to the first embodiment, data sheets are identified based on characters/graphics of the same shape in addition to ruled-line information, it is possible to discriminate between the data sheet XX shown in FIG. 16A and the data sheet XX' shown in FIG. 16B as different kinds of data sheets. In other words, according to the conventional data sheet identification device, the data sheet XX and the data sheet XX' are erroneously identified as the same kind of data sheets as ruled lines do not exist in the data sheet XX and the data sheet XX'.

On the other hand, according to the first embodiment, it is possible to discriminate between the data sheet XX and the data sheet XX' as different kinds of data sheets, as the characters/graphics of the same shape within the data sheet XX shown in FIG. 16A (characters/graphics of the same shape: "0123456789-123", "¥" and "5980") and the characters/graphics of the same shape within the data sheet XX' shown in FIG. 16B (characters of the same shape: "0123456798-123") are different.

As explained above, according to the first embodiment, data sheets are uniquely identified based on results of collations relating to graphics and characters that have been decided to have the same shape. Therefore, it is possible to correctly identify data sheets that are otherwise erroneously identified based on a result of the conventional collation relating to ruled lines. As a result, it is possible to improve the precision of identification.

Further, according to the first embodiment, data sheet identification is carried out by also taking into account a result of the collation relating to ruled lines. Therefore, it is possible to correctly identify data sheets based on a result of the collation relating to ruled lines, even if it is not possible to identify the data sheets based on a result of the collation relating to characters and graphics.

Further, according to the first embodiment, data sheet identification is carried out by also taking into account a result of the collation relating to plane information. Therefore, it is possible to correctly identify data sheets based on a result of the collation relating to plane information, even if it is not possible to identify the data sheets based on results of collations relating to characters and graphics and ruled lines respectively.

In the first embodiment, it is also possible to carry out image correction like a removal of noise and a correction of an inclination for image information in the character/graphics extracting section 50 shown in FIG. 1. This will be explained as a first modification of the first embodiment with reference to a flowchart shown in FIG. 17. It is assumed that image information $X_{AA}$ shown in FIG. 19A has been input to the character/graphics extracting section 50 after the above-described operation. This image information $X_{AA}$ includes noise (black points). Further, this image information $X_{AA}$ is inclined to the left as a whole as compared with a normal position. Therefore, there is a possibility that characters and graphics cannot be correctly extracted from this image information $X_{AA}$.

Figure 17:
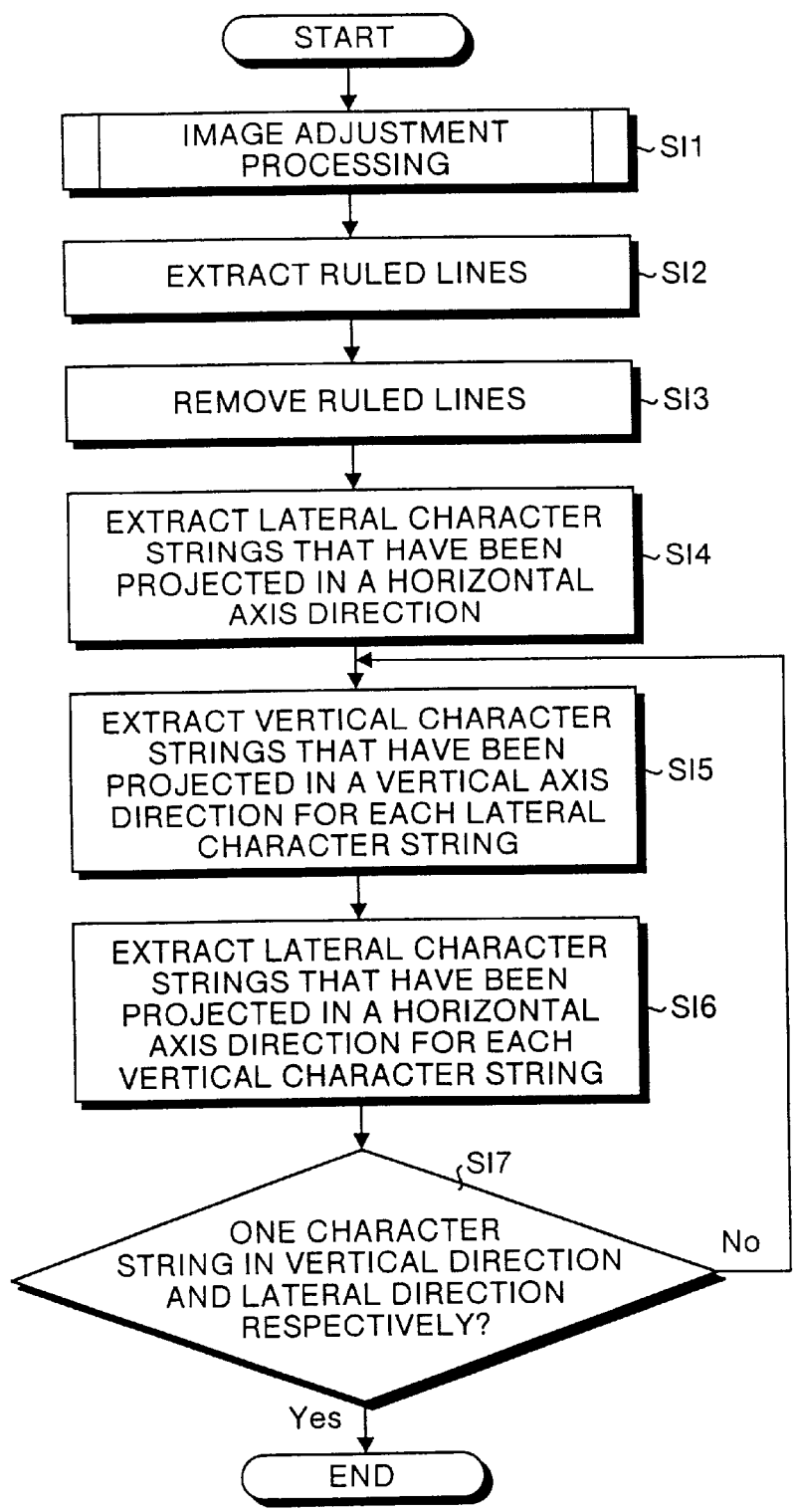
FIG. 17 is a flowchart for explaining a first modification of the first embodiment.

At step SI1 shown in FIG. 17, the character/graphics extracting section 50 executes an image adjustment processing relating to a noise removal and an inclination correction.

Figure 18:
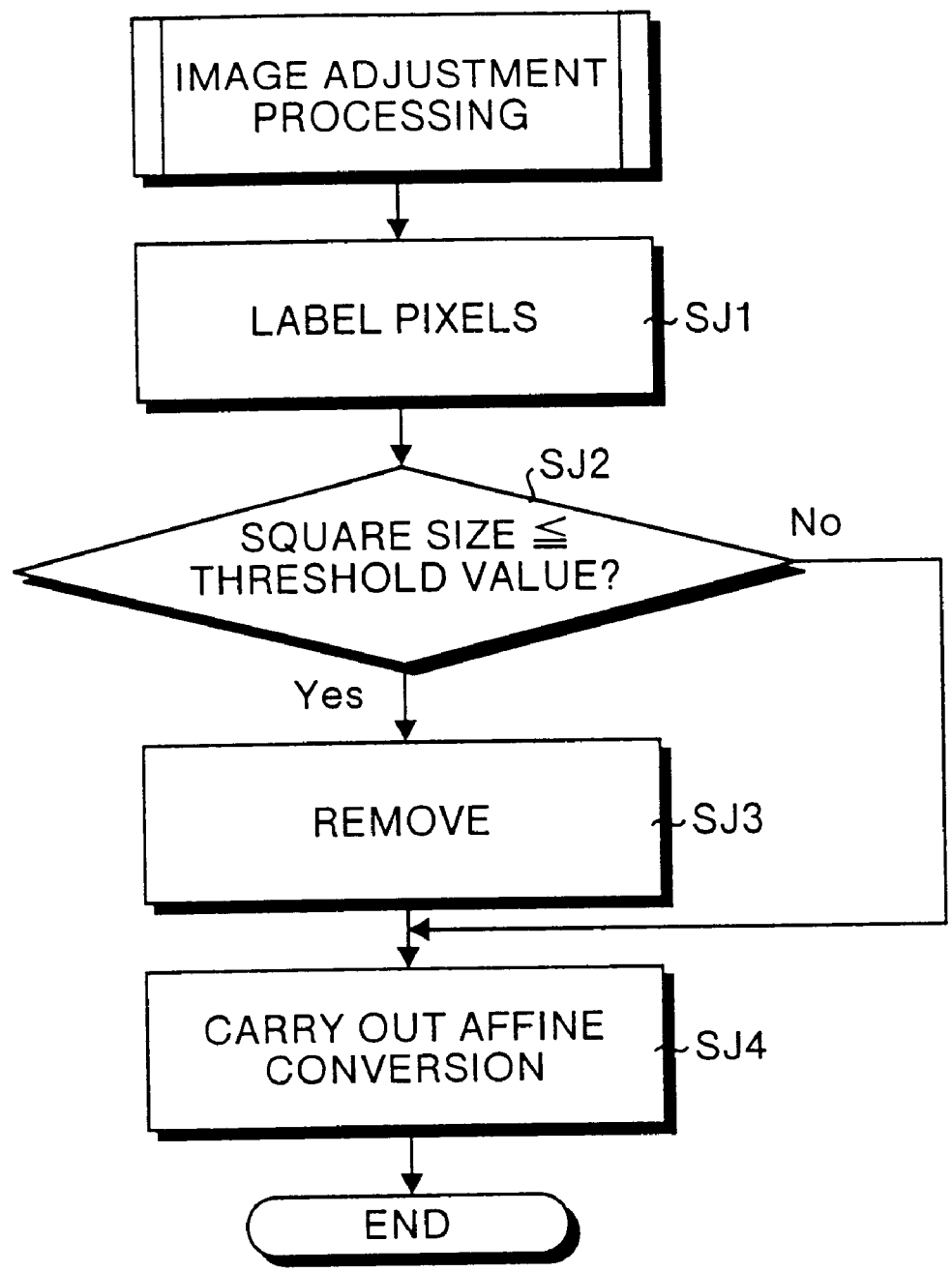
FIG. 18 is a flowchart for explaining an image adjustment processing shown in FIG. 17.

Specifically, at step SJ1 shown in FIG. 18, the character/graphics extracting section 50 carries out a labeling for labeling a block of pixels in the image information $X_{AA}$. At step SJ2, the character/graphics extracting section 50 makes a decision as to whether a square size of the label is equal to or less than a threshold value or not.

This threshold value is a value for deciding whether the label is noise or not. When a result of the decision made at step SJ2 is "Yes", that is, when the label is noise, the character/graphics extracting section 50 removes the noise from the image information $X_{AA}$ (reference FIG. 19A at step SJ3.

On the other hand, when a result of the decision made at step SJ2 is "No", the character/graphics extracting section 50 executes the processing at step SJ4. At step SJ4, the character/graphics extracting section 50 affine converts each pixel of image information $X_{AA}$ to correct the inclination. Thus, image information $X_{AA}'$ shown in FIG. 19B is obtained after the noise has been removed and the inclination has been corrected. Thereafter, the character/graphics extracting section 50 executes the processing at step SI2 to step SI7 using the image information $X_{AA}'$. The processing at step SI2 to step SI7 is the same as the processing at step SA1 to step SA6.

As explained above, according to the first modification of the first embodiment, characters and graphics are extracted after an image adjustment (for example, a noise removal) has been carried out to the image information. Therefore, it is possible to further improve the precision of data sheet identification without an influence of noise.

Figure 20:
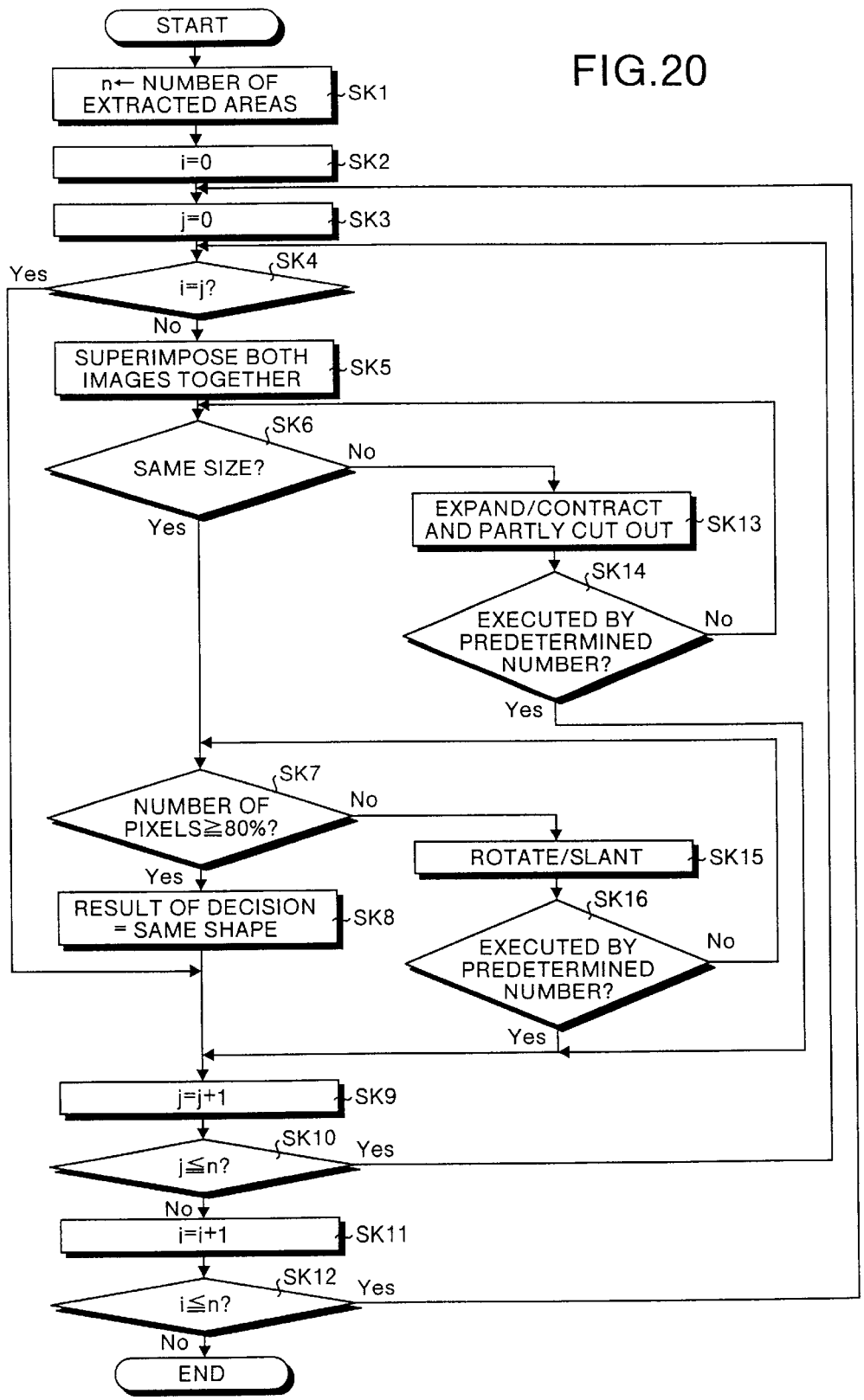
FIG. 20 is a flowchart for explaining a second modification of the first embodiment.

In the first embodiment, it is also possible to make a decision about the same shape of character or graphics by comparing the character or graphics with a target (character or graphics) after the character or graphics has been expanded/contracted, rotated/slanted, or partly cut out in the identical shape deciding section 60 shown in FIG. 1. This will be explained as a second modification of the first embodiment with reference to a flowchart shown in FIG. 20.

Figure 21A:
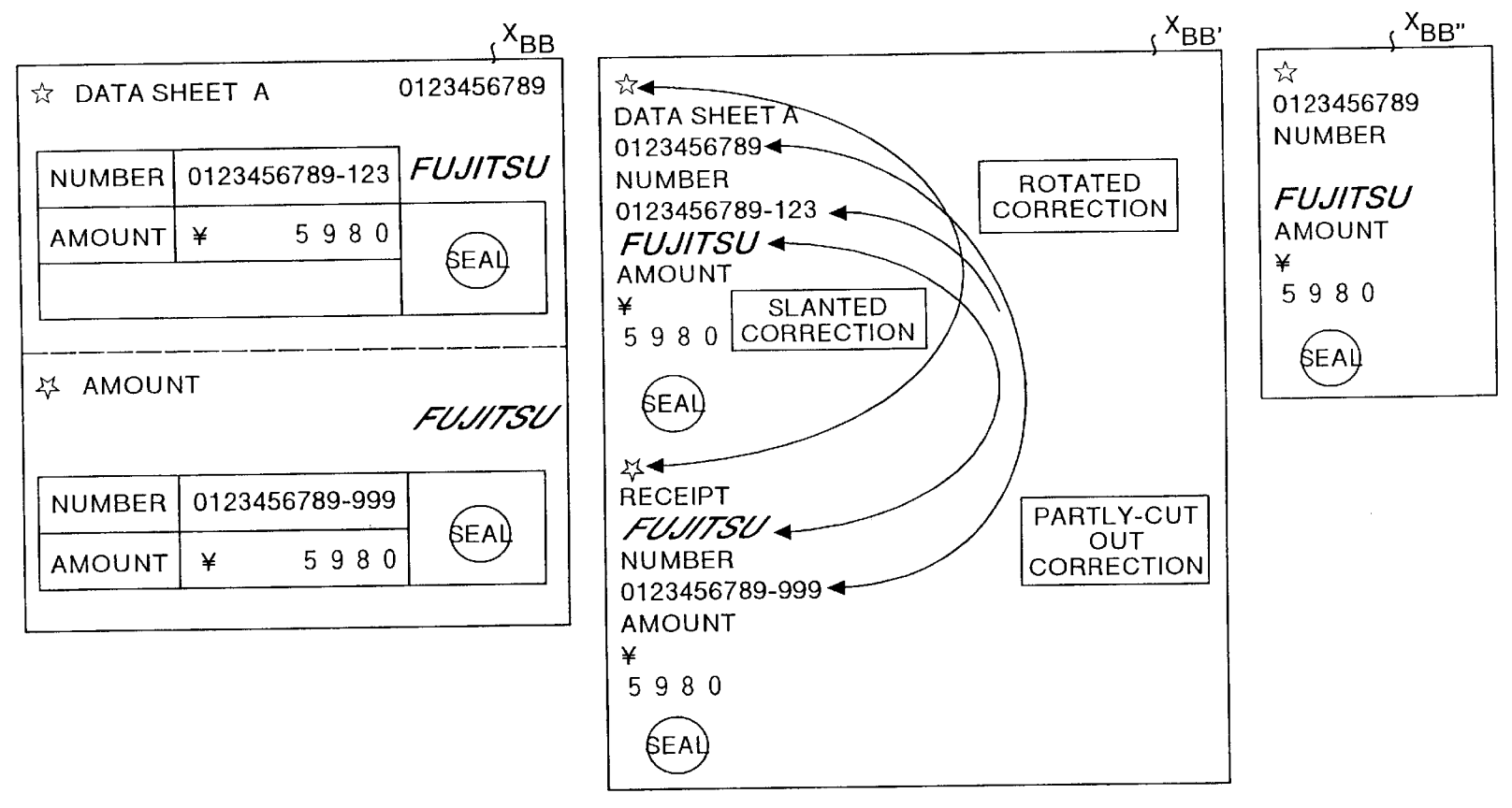

It is assumed that the character/graphics extracting section 50 has extracted nineteen characters and graphics within a group $X_{BB}'$ shown in FIG. 21B from image information $X_{BB}$ shown in FIG. 21A. In this state, at step SK1 shown in FIG. 20, the identical shape deciding section 60 substitutes the number of extracted areas into n. The number of extracted areas is the number of characters and graphics (=19) within the group $X_{BB}'$ shown in FIG. 21B. Step SK2 to step SK12 take a similar processing to that at step SB2 to step SB12 shown in FIG. 5, and therefore, a detailed explanation of these steps will be omitted. Step SK13 to SK16 will be explained in detail.

It is assumed that at step SK5, the identical shape deciding section 60 has superimposed graphics as a target (an asterisk positioned at an upper stage) corresponding to a variable i within the group $X_{BB}'$ with graphics (an asterisk positioned at a lower stage) corresponding to a variable j within the group $X_{BB}'$. Then, at step SK6, the identical shape deciding section 60 makes a decision whether both graphics have the same size or not. The graphics (the asterisk positioned at a lower stage) corresponding to the variable j is in a state that it has been rotated by a predetermined angle from the graphics (the asterisk positioned at an upper stage) corresponding to the variable i. Therefore, the identical shape deciding section 60 sets "Yes" as a result of the decision made at step SK6 as both graphics have the same size.

At step SK7, the identical shape deciding section 60 makes a decision as to whether or not the number of pixels at the superimposed portion is 80% or more of the number of pixels of the graphics (the asterisk positioned at an upper stage) corresponding to the variable i. In this case, as the graphics (the asterisk positioned at a lower stage) corresponding to the variable j is in a state that it has been rotated by the predetermined angle, it is assumed that the number of pixels at the superimposed portion is less than 80%. Therefore, the identical shape deciding section 60 sets "No" as a result of the decision made at step SK7.

At step SK15, the identical shape deciding section 60 executes a rotation correction or a slanting correction to be described later for rotating the graphics of the variable j by a set angle. At step SK16, the identical shape deciding section 60 makes a decision as to whether the rotation (or slanting) correction has been executed by a predetermined number or not. When a result of the decision made is "No", the identical shape deciding section 60 makes a decision at step SK7 as described above. When a result of the decision made at step SK7 is "No", the identical shape deciding section 60 rotates the graphics corresponding to the variable j by a set angle at step SK15.

It is assumed that after the correction at step SK15, the superimposed portion of the graphics corresponding to the variable j and the graphics (target) corresponding to the variable i is equal to or more than 80% of the number of pixels of the graphics (target) corresponding to the variable i. A result of the decision made at step SK16 is "No", and the identical shape deciding section 60 sets "Yes" as a result of the decision made at step SK7. In other words, the identical shape deciding section 60 has decided that the both graphics are in the same shape. When a result of the decision made at step SK16 is "Yes", the identical shape deciding section 60 makes a decision that it is impossible to carry out a rotation correction (or a slanting correction), and executes the processing at step SK9.

It is assumed that at step SK5, the identical shape deciding section 60 has superimposed characters as a target (a character string "0123456789" positioned at an upper stage) corresponding to the variable i within the group $X_{BB}'$ with graphics (a character string "0123456789-999" positioned at a lower stage) corresponding to the variable j within the group $X_{BB}'$. In this case, the identical shape deciding section 60 sets "No" as a result of the decision made at step SK6.

At step SK13, the identical shape deciding section 60 executes a part cutout processing (or an expansion/contraction processing to be described later) for cutting out a part (for example, a character string "01234") of the character string "0123456789-999" positioned at a lower stage) corresponding to the variable j. At step SK14, the identical shape deciding section 60 makes a decision as to whether a part cut-out processing (or an expansion/contraction processing) has been carried out by a predetermined number or not. The identical shape deciding section 60 sets "No" as a result of the decision made at step SK14, and makes a decision at step SK6 as described above. When a result of the decision made at step SK14 is "Yes", the identical shape deciding section 60 executes the processing at step SK9.

When a result of the decision made at step SK6 is "No", the identical shape deciding section 60 expands a part cut-out range at step SK13 and cut outs a part (for example a character string "0123456789") of the character string "0123456789-999" positioned at a lower stage) corresponding to the variable j. The identical shape deciding section 60 sets "No" as a result of the decision made at step SK14. At step SK6, the identical shape deciding section 60 sets "Yes"

as a result of the decision made, as the target character (the character string "0123456789" positioned at an upper stage) corresponding to the variable i within the group $X_{BB}'$ has the same size as the part (the character string "0123456789") that has been cut out at step SK13.

At step SK5, the identical shape deciding section 60 has superimposed graphics as a target (FUJITSU positioned at an upper stage) corresponding to the variable i within the group $X_{BB}'$ with graphics (FUJITSU positioned at a lower stage) corresponding to the variable j within the group $X_{BB}'$. At step SK6, the identical shape deciding section 60 makes a decision as to whether both have the same size or not.

In this case, the graphics (FUJITSU positioned at a lower stage) corresponding to the variable j has the same size as the graphics (FUJITSU positioned at an upper stage) corresponding to the variable i, but is written in a slanted font. Therefore, the identical shape deciding section 60 sets "Yes" as a result of the decision made at step SK6, as both graphics have the same size.

At step SK7, the identical shape deciding section 60 makes a decision as to whether or not the number of pixels at the superimposed portion is 80% or more of the number of pixels of the graphics (FUJITSU at an upper stage) corresponding to the variable i. In this case, as the graphics (FUJITSU positioned at a lower stage) corresponding to the variable j is in a state that it has been rotated by a predetermined angle, it is assumed that the number of pixels at the superimposed portion is less than 80%. Therefore, the identical shape deciding section 60 sets "No" as a result of the decision made at step SK7.

At step SK15, the identical shape deciding section 60 executes a slanting correction (or the above-described rotation correction) for correcting the graphics (FUJITSU positioned at a lower stage) corresponding to the variable j to be in a correct standing state. Thereafter, the above operation is repeated, and the graphics corresponding to the variable j is set to a correct standing state. Therefore, the identical shape deciding section 60 sets "Yes" as a result of the decision made at step SK7.

In the first modification, at step SK13, the size of a character or graphics corresponding to the variable j may be compared with the size of a character or graphics (target) corresponding to the variable i after the character or graphics corresponding to the variable j has been expanded or contracted at a predetermined rate, instead of the above-described cut-out processing.

As explained above, according to the second modification of the first embodiment, the identical shape deciding section 60 rotates, expands or contracts the extracted character or graphics that is to be compared. Therefore, it is possible to avoid an influence of image deterioration that is generated at the time of reading data sheets. Further, according to the second modification, the method of deciding the same shape can also cover characters and graphics that are partly in the same shape. Therefore, it is possible to correctly identify data sheets even if a part of the characters or graphics has been damaged and lost due to deterioration of the image.

Figure 22:
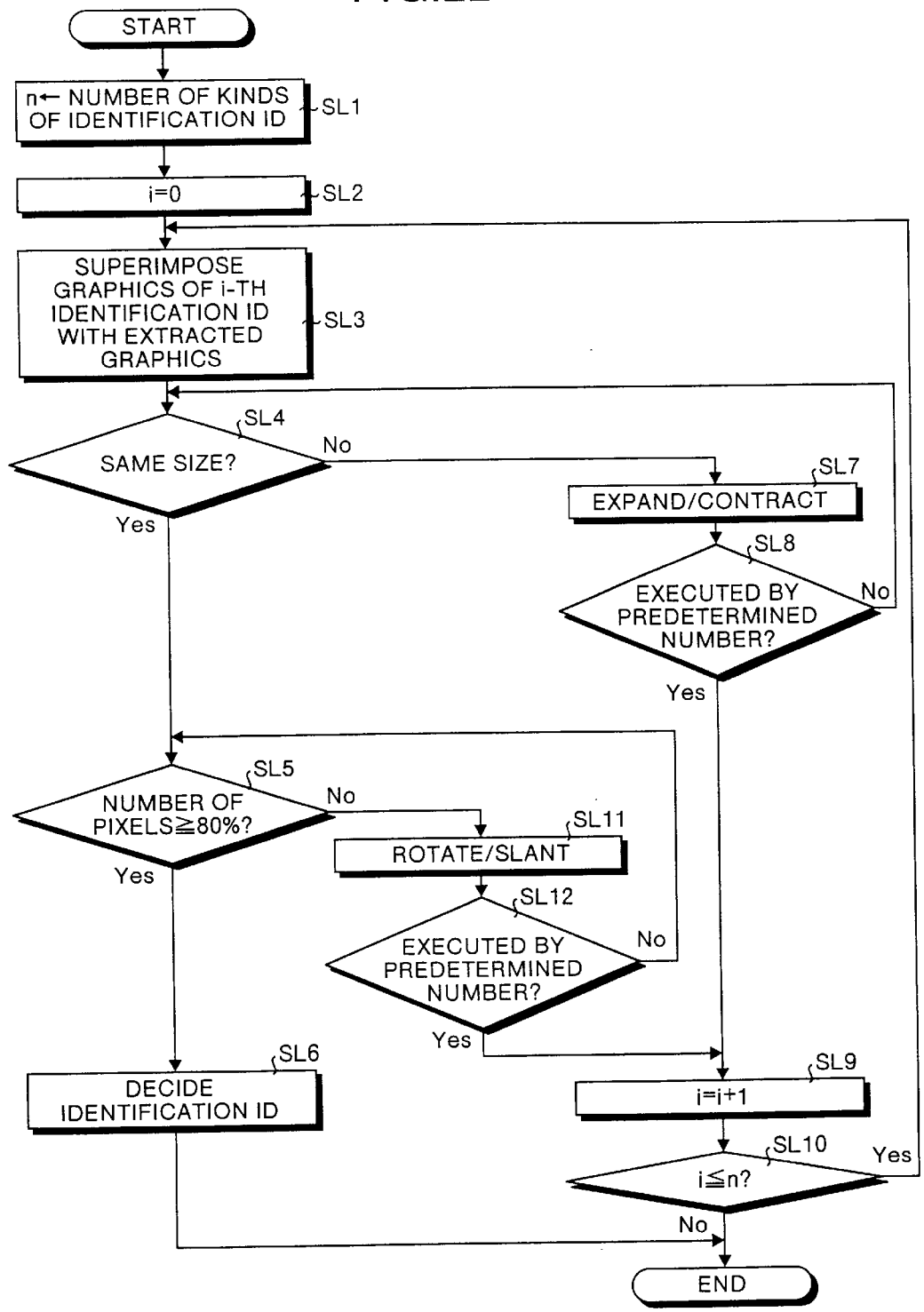
FIG. 22 is a flowchart for explaining a third modification of the first embodiment.

In the first embodiment, it is also possible to make a decision about the same shape of graphics by comparing the graphics with a target (character or graphics) after the graphics has been expanded/contracted or rotated/slanted in the graphics collating section 80 shown in FIG. 1, in a similar manner to that of the second modification. This will be explained as a third modification of the first embodiment with reference to a flowchart shown in FIG. 22.

Figure 23:
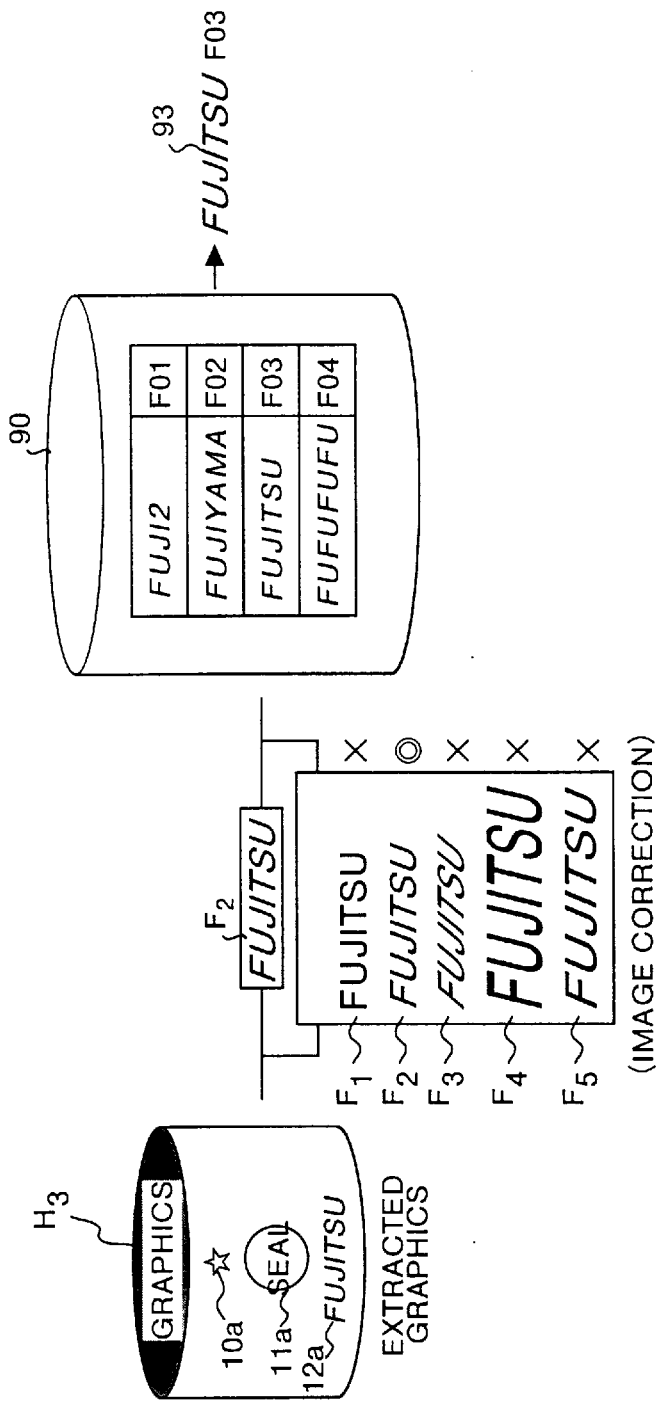
FIG. 23 is a diagram for explaining the third modification of the first embodiment.

It is assumed that the character/graphics identifying section 70 has identified graphics 10a, 11a and 12a within a graphic group $H_3$ (reference FIG. 4) shown in FIG. 23 as graphics. Step SL1 to step SL6 and step SL9 and SL10 shown in FIG. 22 take a similar processing to that at step SD1 to SD8 shown in FIG. 9, and therefore, a detailed explanation of these steps will be omitted. Step SL7, step SL8, step SL11 and step SL12 will be explained in detail next.

At step SL3, registered graphics corresponding to a variable i within the graphic dictionary database 90 (for example, "FUJITSU" corresponding to the data sheet ID F03) is superimposed with the graphics 12a within the graphic group $H_3$. At step SL4, the graphics collating section 80 makes a decision as to whether both are in the same size or not. When the size of the graphics 12a is the same as the size of the registered graphics ("FUJITSU" corresponding to the data sheet ID F03) like graphics $F_2$, the graphics collating section 80 sets "Yes" as a result of the decision made at step SL4.

On the other hand, when the size of the graphics 12a does not coincide with the size of the registered graphics ("FUJITSU" corresponding to the data sheet ID F03), the graphics collating section 80 sets "No" as a result of the decision made at step SL4. At step SL7, the graphics collating section 80 executes an expansion/contraction processing for expanding or contracting the graphics 12a at a predetermined rate. When the graphics 12a has been expanded, the graphics 12a becomes as shown by graphics $F_4$. At step SL8, the graphics collating section 80 makes a decision as to whether the expansion/contraction has been executed by a predetermined number or not. In this case, the graphics collating section 80 sets "No" as a result of the decision made. Thereafter, the above operation is repeated.

When the size of the graphics 12a has become the same as the size of the registered graphics ("FUJITSU" corresponding to the data sheet ID F03) based on the expansion/contraction, the graphics collating section 80 sets "Yes" as a result of the decision made at step SL4. When a result of the decision made at step SL8 is "Yes", the graphics collating section 80 executes the processing at step SL9.

When the number of pixels at the superimposed portion is less than 80% of pixels of the registered graphics ("FUJITSU" corresponding to the data sheet ID F03) corresponding to the variable i, the graphics collating section 80 sets "No" as a result of the decision made at step SL5. At step SL11, the graphics collating section 80 rotates or slants the graphics 12a (or the expanded or contracted graphics 12a) in a similar manner to that at step SK15 (reference FIG. 20). At step SL12, the graphics collating section 80 makes a decision as to whether the rotation/slanting correction has been carried out by a predetermined number or not. In this case, the graphics collating section 80 sets "No" as a result of the decision made. Thereafter, the above operation is repeated.

When the number of pixels at the superimposed portion of the rotation/slanting corrected graphics and the registered graphics ("FUJITSU" corresponding to the data sheet ID F03) has become equal to or more than 80% of pixels of the registered graphics, the graphics collating section 80 sets "Yes" as a result of the decision made at step SL5. When a result of the decision made at step SL12 is "Yes", the graphics collating section 80 executes the processing at step SL9.

As explained above, according to the third modification of the first embodiment, the graphics collating section 80 rotates, expands or contracts the extracted character or graphics that is to be compared. Therefore, it is possible to avoid an influence of image deterioration that is generated at the time of reading data sheets.

Figure 24A:
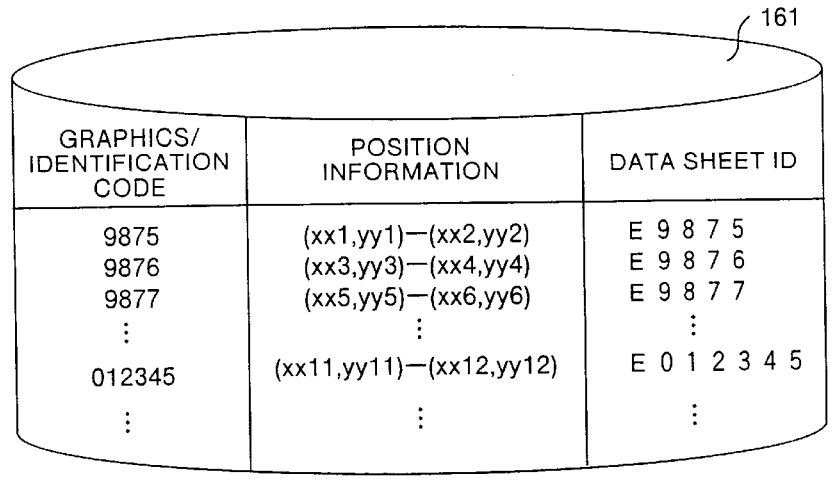
FIGS. 24A to 24C are diagrams for explaining a fourth modification of the first embodiment.

In the first embodiment, the identification code/data sheet ID identifying section 150 may carry out a character collation by using a database 161 shown in FIG. 24A in place of the identification code/data sheet ID database 160 shown in FIG. 1. This will be explained next as a fourth modification of the first embodiment. The database 161 is an addition of position information of characters within the data sheet to the identification code/data sheet ID database 160 shown in FIG. 13. "Graphics/identification codes" in FIG. 24A shows identification codes. This "graphics/identification codes" corresponds to the identification codes shown in FIG. 13.

Figure 24B:
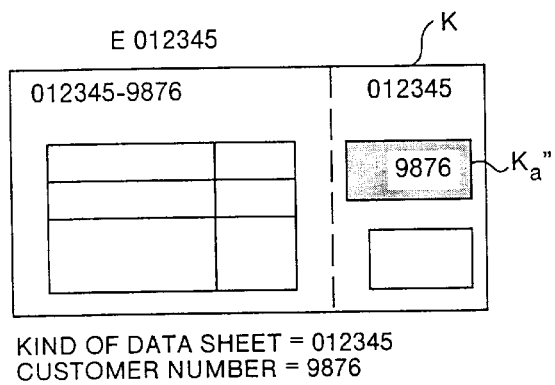

An identification code "012345" within the database 161 shown in FIG. 24A corresponds to a character string "012345" within a data sheet K shown in FIG. 24B. Position information "(xx11, yy11)-(xx12, yy12)" corresponding to the identification code "012345" within the database 161 is information that shows a position of the character string "012345" within a data sheet K shown in FIG. 24B. A data sheet ID of the data sheet K is "E012345" that has been set corresponding to the identification code "012345" within the database 161.

Figure 24C:
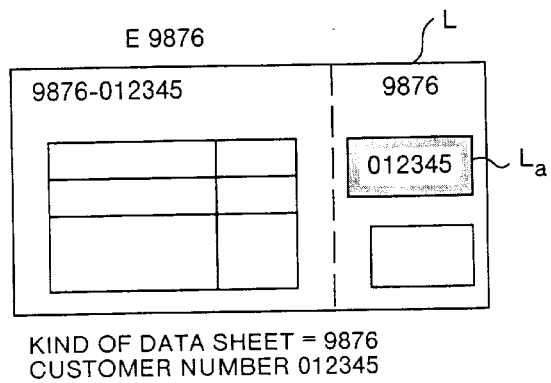

On the other hand, an identification code "9876" within the database 161 shown in FIG. 24A corresponds to a character string "9876" within a data sheet L shown in FIG. 24C. Position information "(xx3, yy3)-(xx4, yy4)" corresponding to the identification code "9876" within the database 161 is information that shows a position of the character string "9876" within a data sheet L shown in FIG. 24C. A data sheet ID of the data sheet L is "E9876" that has been set corresponding to the identification code "9876" within the database 161.

The fourth modification of the first embodiment will be explained with reference to a flowchart shown in FIG. 25. When the data sheet K shown in FIG. 24B has been read by the scanner 10 (reference FIG. 1), the character/graphics identifying section 70 inputs information of the same character strings and position information of the character strings into the character recognizing section 100 through the above-described operation. The character strings include the character string "9876" and the character string "012345" shown in FIG. 24B. The character string "9876" is positioned within an area Ka".

Figure 25:
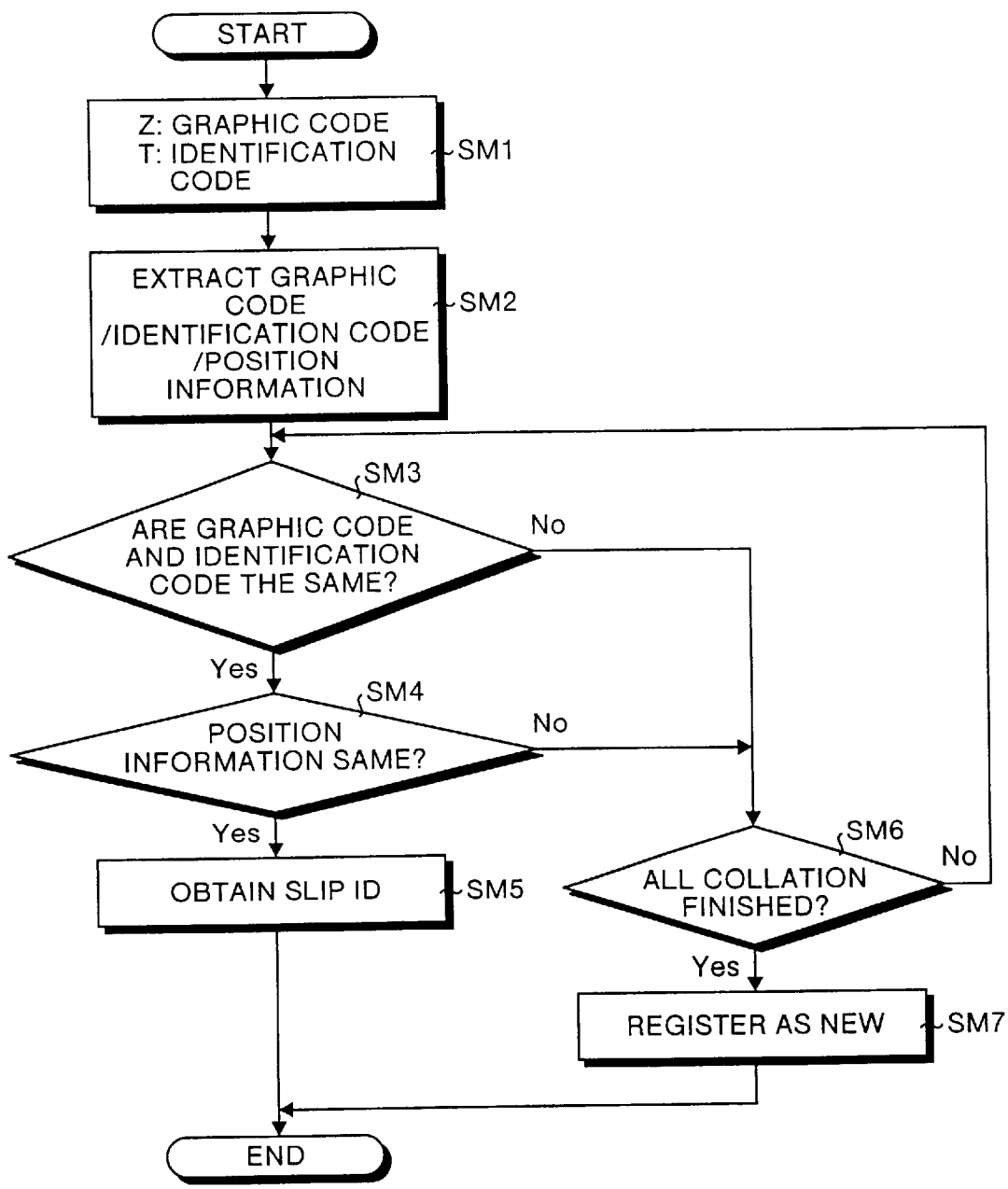
FIG. 25 is a flowchart for explaining the fourth modification of the first embodiment.

At step SM1 shown in FIG. 25, the character recognizing section 100 sets T as an identification code, and recognizes characters of the input character strings "9876" and "012345". Then, the character recognizing section 100 delivers a result of the character recognition (an identification code T) and position information corresponding to these character strings to the identification code/data sheet ID identifying section 150. At step SM2, the identification code/data sheet ID identifying section 150 extracts the identification code T (in this case, "9876" and "012345") and the respective position information.

At step SM3, the identification code/data sheet ID identifying section 150 sequentially collates the database 161 shown in FIG. 24A and the identification code T, and makes a decision as to whether there is the same identification code or not. As the identification code "9876" within the database 161 and the identification code T "9876" are the same, the identification code/data sheet ID identifying section 150 sets "Yes" as a result of the decision made at step SM3.

At step SM4, the identification code/data sheet ID identifying section 150 makes a decision as to whether the position information "(xx3, yy3)-(xx4, yy4)" corresponding to the identification code "9876" within the database 161 and the position information corresponding to the identification code T "9876" are the same or not. As both position information are not the same, the identification code/data sheet ID identifying section 150 sets "No" as a result of the decision made at step SM4.

The position information "(xx3, yy3)-(xx4, yy4)" corresponding to the identification code "9876" within the database 161 is position information of "9876" within the data sheet L that is a different kind of data sheet from the data sheet K. Therefore, according to the fourth modification, it is possible to discriminate between the data sheet K and the data sheet L in both of which the same character string exists, as different kinds of data sheets, by collating their position information as well.

At step SM6, the identification code/data sheet ID identifying section 150 makes a decision as to whether all collations have been finished or not. In this case, the identification code/data sheet ID identifying section 150 set "No" as a result of the decision made at step SM6. As the identification code "012345" within the database 161 and the identification code T "012345" are the same, the identification code/data sheet ID identifying section 150 sets "Yes" as a result of the decision made at step SM3.

At step SM4, the identification code/data sheet ID identifying section 150 makes a decision as to whether the position information "(xx11, yy11)-(xx12, yy12)" corresponding to the identification code "012345" within the database 161 and the position information corresponding to the identification code T "012345" are the same or not. As both position information are the same, the identification code/data sheet ID identifying section 150 sets "Yes" as a result of the decision made at step SM4.

At step SM5, the identification code/data sheet ID identifying section 150 obtains a data sheet ID "E012345" corresponding to the identification code "012345" from the database 161, and delivers this data sheet ID to the integrating section 240. When a result of the decision made at step SM6 is "Yes", the identification code/data sheet ID identifying section 150 sets the identification code and the position information as new at step SM7, and newly registers the identification code and the position information together with the data sheet ID that has been input by a user, into the database 161.

Figure 4:
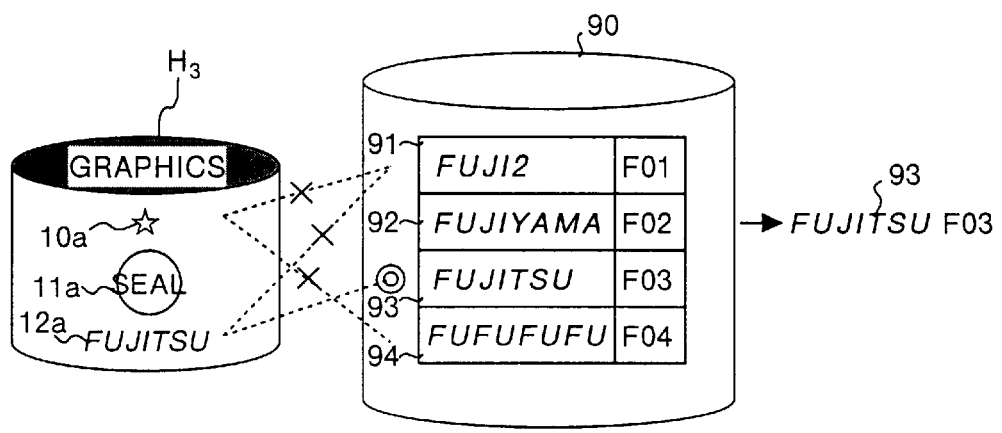
FIG. 4 is a diagram showing a graphic dictionary database 90 shown in FIG. 1.

Further, in the fourth modification, the graphics collating section 80 may collate graphics using the database 161 including the position information shown in FIG. 24A in place of the graphic dictionary database 90 shown in FIG. 4. The database 161 used by the graphics collating section 80 is an addition of the position information of graphics within the data sheet to the graphic dictionary database 90 shown in FIG. 4. The "graphics/identification codes" in FIG. 24A shows graphics in this case. The graphic codes ("graphics/identification codes") are registered graphics (not shown) similar to the registered graphics 91 to 94 shown in FIG. 4.

When the data sheet K shown in FIG. 24B has been read by the scanner 10 (reference FIG. 1), the character/graphics identifying section 70 inputs graphic information of the same shape and position information of the graphics of the same shape into the graphics collating section 80 through the above-described operation. Thus, at step SM1 shown in FIG. 25, the graphics collating section 80 sets Z to a graphic code. At step SM2, the graphics collating section 80 extracts the graphic code Z and the respective position information.

At step SM3, the graphics collating section 80 sequentially collates the database 161 shown in FIG. 24A and the graphic code Z in a similar manner to the identification code/data sheet ID identifying section 150, and makes a decision as to whether there is the same graphic code or not. The graphics collating section 80 sets "Yes" as a result of the decision made at step SM3. At step SM4, the graphics collating section 80 makes a decision as to whether the position information corresponding to the graphic code within the database 161 and the position information corresponding to the graphic code Z are the same or not. As both position information are not the same, the graphics collating section 80 sets "No" as a result of the decision made at step SM4.

At step SM6, the graphics collating section 80 makes a decision as to whether all collations have been finished or not. In this case, the graphics collating section 80 set "No" as a result of the decision made at step SM6. As the graphic code within the database 161 and the graphic code Z are the same, the graphics collating section 80 sets "Yes" as a result of the decision made at step SM3. At step SM4, the graphics collating section 80 makes a decision as to whether the position information corresponding to the graphic code within the database 161 and the position information corresponding to the graphic code Z are the same or not. As both position information are the same, the graphics collating section 80 sets "Yes" as a result of the decision made at step SM4. At step SM5, the graphics collating section 80 obtains a data sheet ID corresponding to the graphic code from the database 161, and delivers this data sheet ID to the integrating section 240.

As explained above, according to the fourth modification of the first embodiment, it is possible to collate characters and graphics by also taking into account position information of characters and graphics. Therefore, it is possible to avoid an erroneous identification of data sheets due to difference in positions.

Figures 26A, 26B:
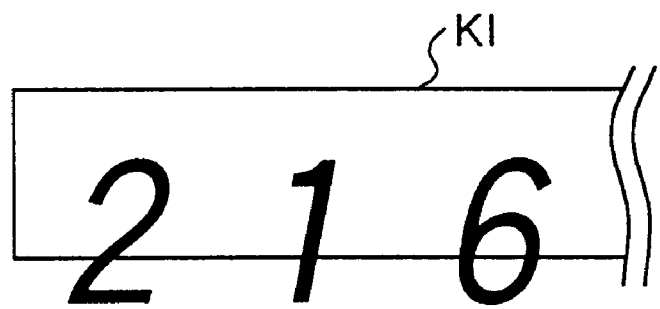
FIGS. 26A and 26B are diagrams for explaining a fifth modification of the first embodiment.
Figure 27:
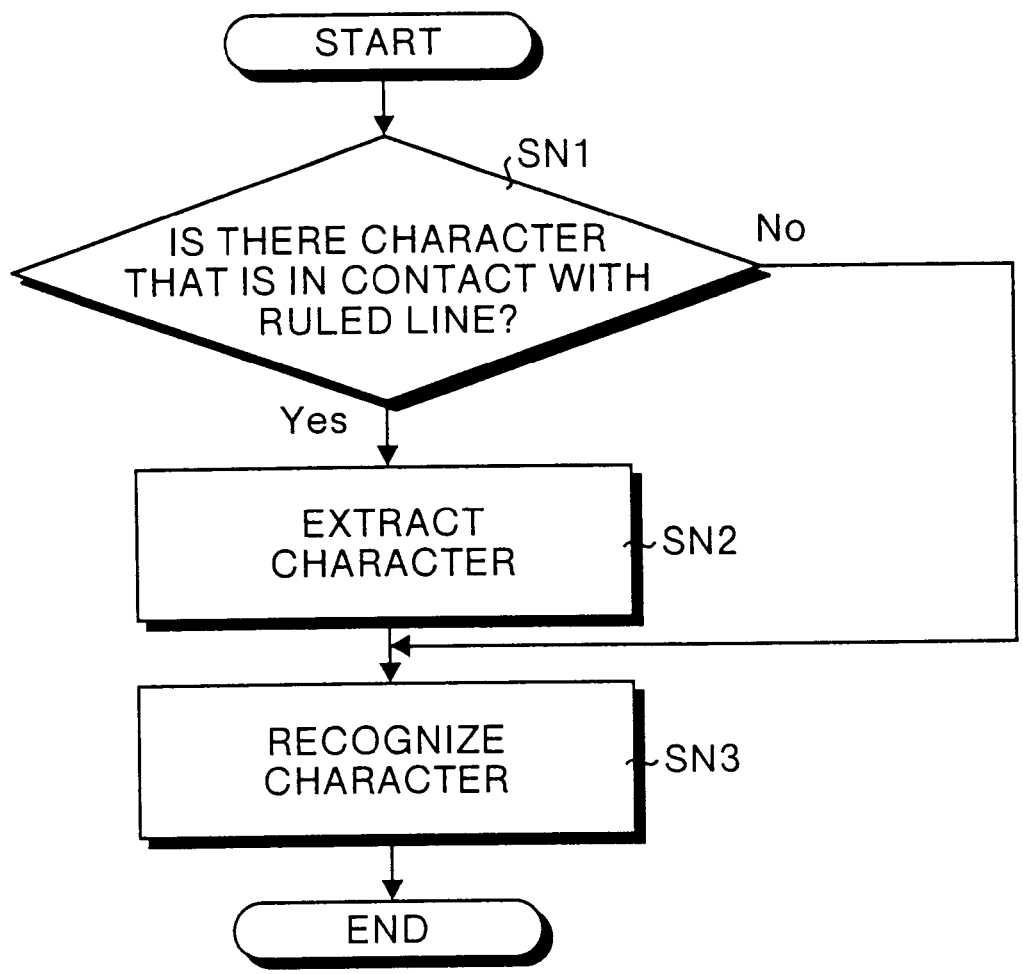
FIG. 27 is a flowchart for explaining the fifth modification of the first embodiment.

In the first embodiment, there is a case where the character/graphics extracting section 50 cannot correctly extract characters when a character (216) on a data sheet is in contact with a ruled line KI as shown in FIG. 26A as the pixels of the character (216) are superimposed with the pixels of the ruled line KI. In this case, a character recognition rate of the character recognizing section 100 is lowered. Therefore, in this case, an image extracting system as disclosed in Japanese Patent Application Laid-open (JP-A) No. 6-309498 may be used, whereby the character/graphics extracting section 50 correctly extracts only characters and then the character recognizing section 100 recognizes the characters. This will be explained next as a fifth modification of the first embodiment with reference to a flowchart shown in FIG. 27.

At step SN1, the character/graphics extracting section 50 makes a decision as to whether there is a character that is in contact with ruled lines or not. When the character (216) is in contact with the ruled line KI as shown in FIG. 26A, for example, the character/graphics extracting section 50 sets "Yes" as a result of the decision made at step SN1. When a result of the decision made at step SN1 is "No", the character recognizing section 100 executes a character recognition processing through an operation similar to that of the first embodiment.

At step SN2, the character/graphics extracting section 50 extracts a part pattern in which pixels that constitute the ruled line KI are connected with pixels that constitute the character, and then extracts a linear part of the ruled line KI. Next, based on the extracted linear part, the character/graphics extracting section 50 divides the part pattern into a first pattern that includes only the linear part and a second pattern in which the character is in contact with the ruled line KI. Next, the character/graphics extracting section 50 extracts only the character by separating the first pattern from the second pattern.

At step SN3, the character recognizing section 100 recognizes the character based on only the character extracted at step SN2 in a similar manner to that of the first embodiment. In the fifth modification, the printed-character/handwritten character deciding section 110 may carry out the character recognition processing (step SN3).

As explained above, according to the fifth modification of the first embodiment, it is possible to extract only characters even if a character exists on a ruled line. As there is no influence of the ruled line, it is possible to further increase the precision of data sheet identification.

Figure 28A:
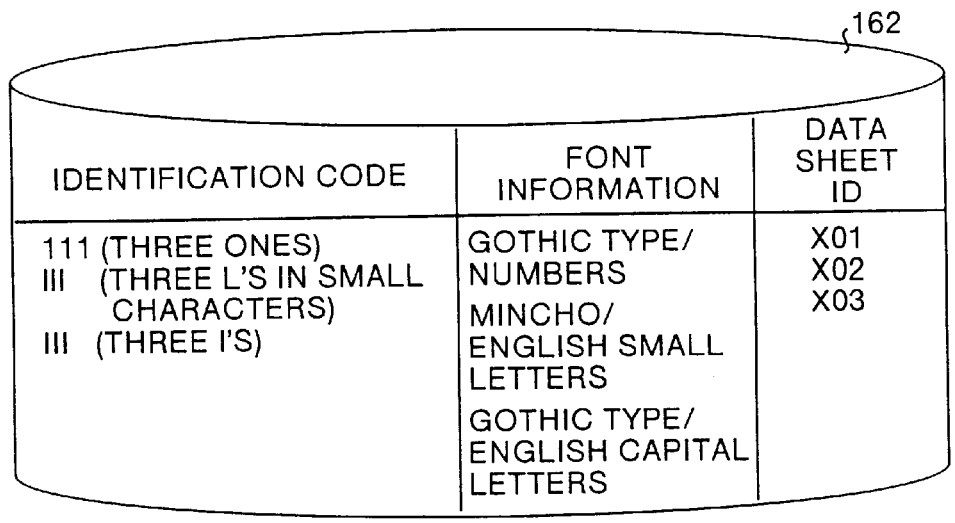
FIGS. 28A and 28B are diagrams for explaining a sixth modification of the first embodiment.
Figure 29:
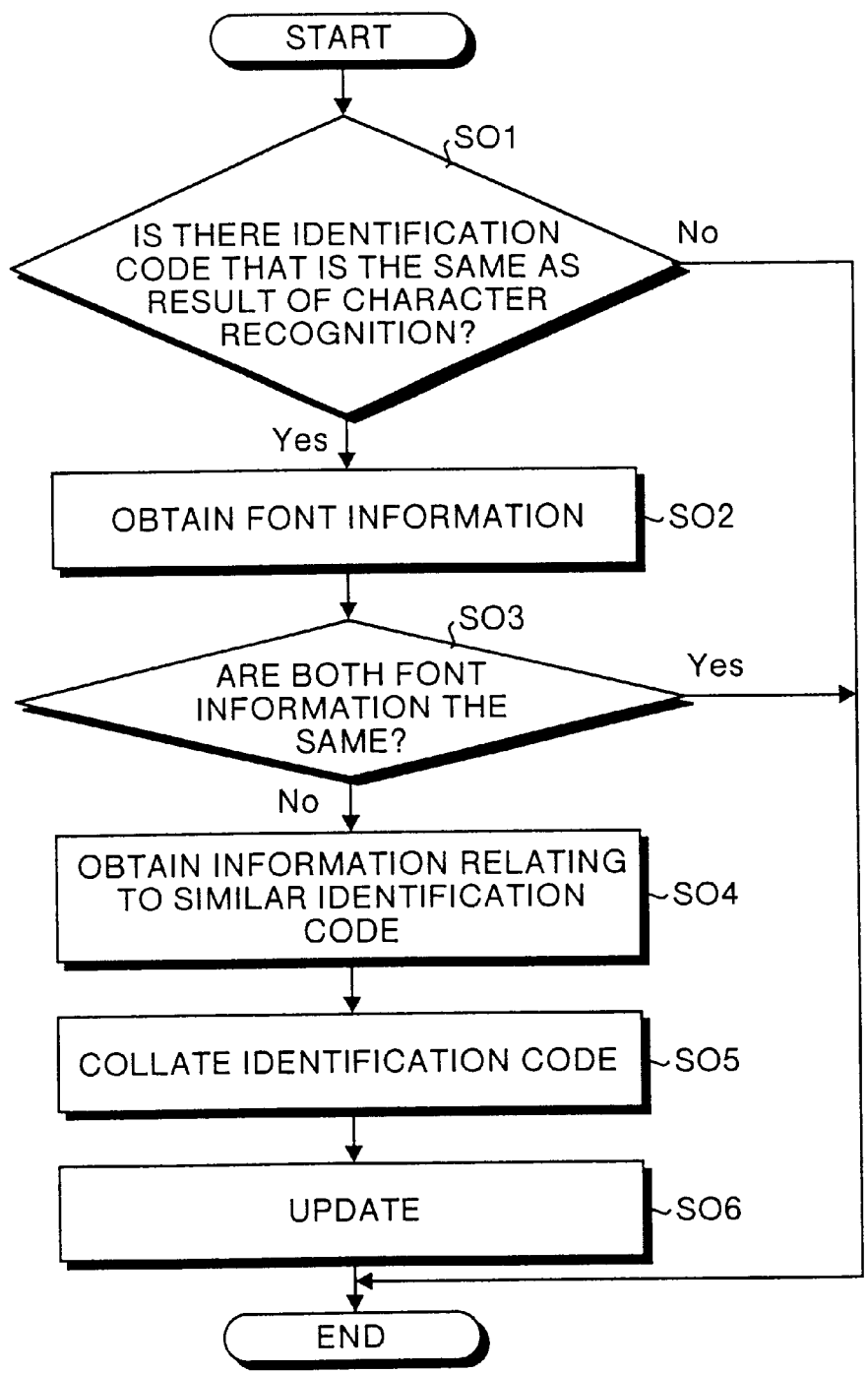
FIG. 29 is a flowchart for explaining the sixth modification of the first embodiment.

In the first embodiment, an identification code/data sheet ID database 162 shown in FIG. 28A may be used in place of the identification code/data sheet ID database 160 shown in FIG. 13. The identification code/data sheet ID database 162 is an addition of font information showing kinds of font of characters (for example, Gothic type, Mincho type, numerals, English small letters, English capital letters) to the identification codes and data sheet IDs of the identification code/data sheet ID database 160. This will be explained as a sixth modification of the first embodiment with reference to a flowchart shown in FIG. 29.

Figure 28B:
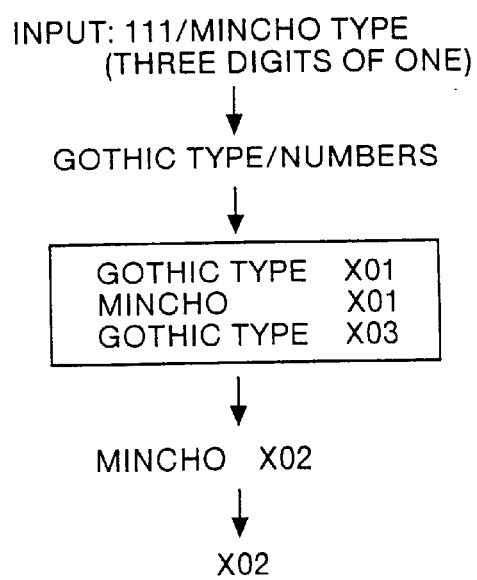

According to the sixth modification, the printed-character recognizing section 120 also identifies a kind of font of a printed character in addition to a character recognition of the printed character. At step SO1 shown in FIG. 29, the identification code/data sheet ID identifying section 150 makes a decision as to whether or not there exists an identification code that is the same as the result of the character recognition from the character recognizing section 100 (for example, 111 (three digits of a numeral 1), and Mincho type as a font: reference FIG. 28B) in the identification code/data sheet ID database 162. When a result of the decision made is "Yes", at step SO2, the identification code/data sheet ID identifying section 150 obtains from the identification code/data sheet ID database 162 font information (Gothic type/numerals) corresponding to the identification code (111 (three digits of a numeral 1)) that has been decided to be the same at step SO1.

Next, at step SO3, the identification code/data sheet ID identifying section 150 makes a decision as to whether the font information (for example, the Gothic type/numeral) from the character recognizing section 100 and the font information (Gothic type/numerals) obtained at step SO2 coincide with each other or not. In this case, the identification code/data sheet ID identifying section 150 sets "No" as a result of the decision made. When a result of the decision made at step SO3 is "Yes", the identification code/data sheet ID identifying section 150 obtains from the identification code/data sheet ID database 162 the data sheet ID corresponding to the font information that has been decided to be the same. Then, the identification code/data sheet ID identifying section 150 delivers this data sheet ID to the integrating section 240.

At step SO4, the identification code/data sheet ID identifying section 150 collates the identification code (the identification code from the identification code/data sheet ID identifying section 150) from the identification code/data sheet ID database 162 compared at step SO1, with identification codes (111, and III) that are similar to this identification code. At step SO6, the identification code/data sheet ID identifying section 150 updates the identification codes within the identification code/data sheet ID database 162.

As explained above, according to the sixth modification of the first embodiment, it is possible to collate characters by also taking into account font information. Therefore, it is possible to avoid an erroneous identification of data sheets due to difference in font information.

Figure 14:
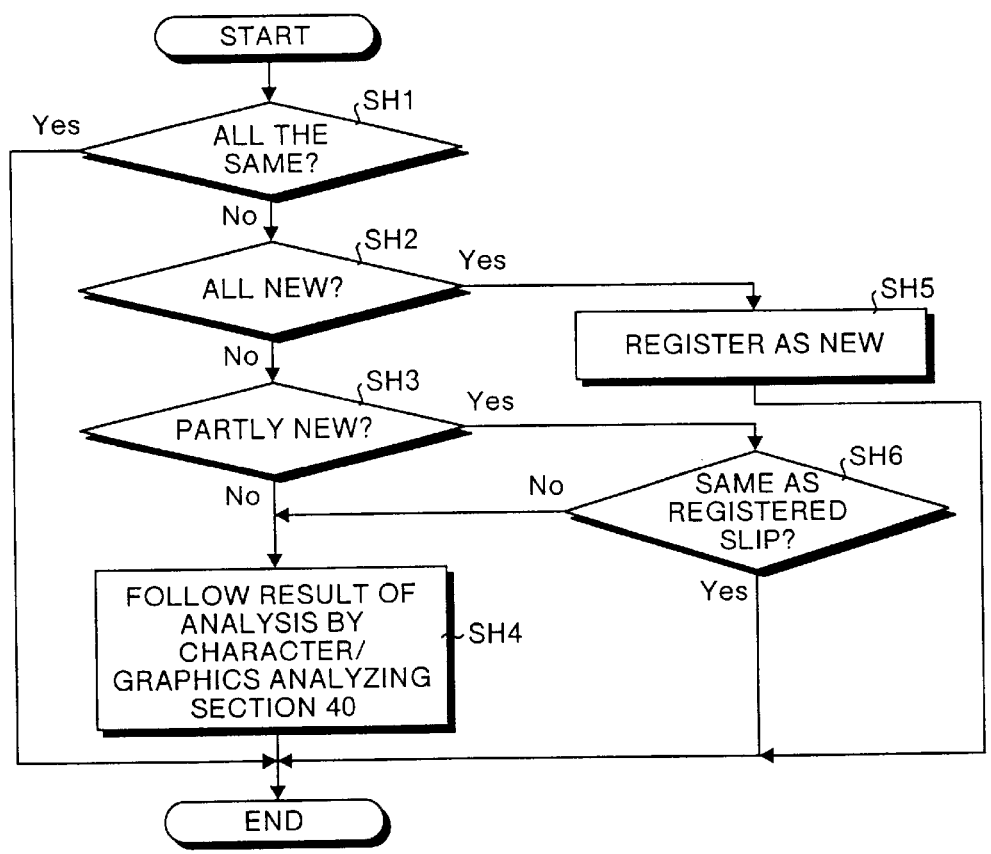
FIG. 14 is a diagram for explaining the operation of a data sheet identifying section 230 shown in FIG. 1.

In the first embodiment, a data sheet ID from the character/graphics analyzing section 40 has been decided to be a result of the data sheet identification according to a result of the analysis (a result of the collation) by the character/graphics analyzing section 40 at step SH4 shown in FIG. 14. However, it is also possible to obtain a result of the data sheet identification based on a data sheet that has been selected from out of a plurality of candidate data sheets. This will be explained next as a seventh modification of the first embodiment with reference to a flowchart shown in FIG. 30.

Figure 30:
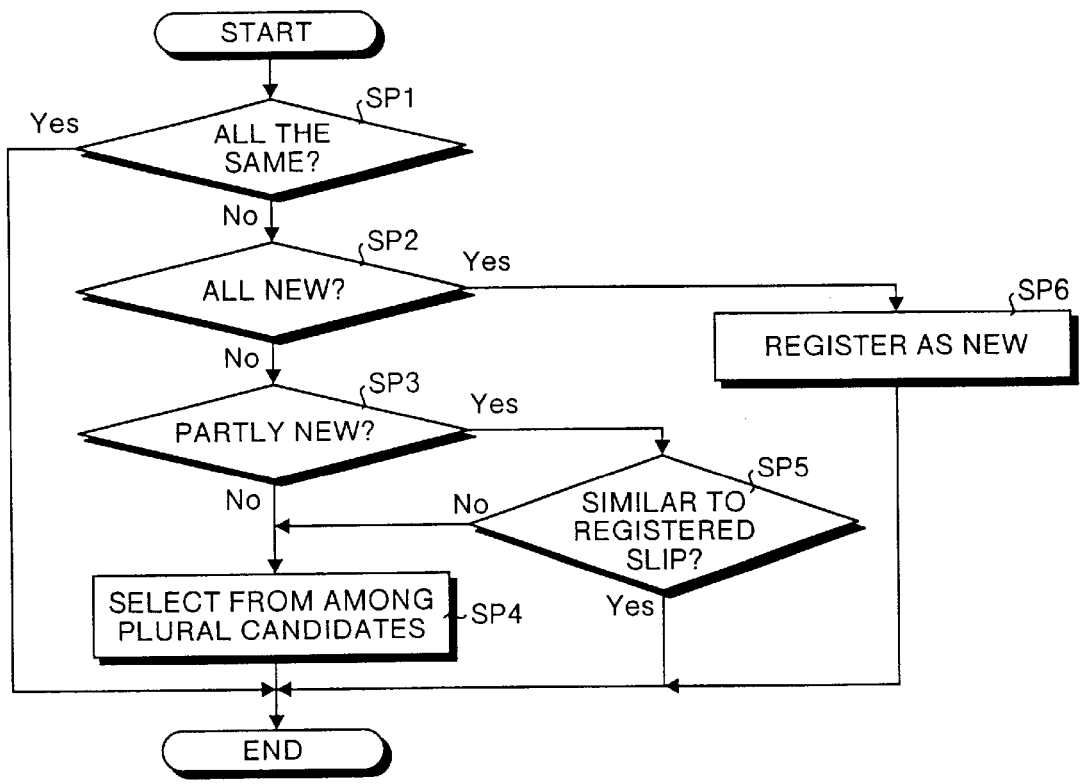
FIG. 30 is a flowchart for explaining a seventh modification of the first embodiment.

Step SP1 to step SP3, step SP5 and step SP6 shown in FIG. 30 are similar to step SH1 to step SH3, step SH6 and step SH5 shown in FIG. 14 respectively, and therefore, their detailed explanation will be omitted. At step SP4 shown in FIG. 30, the integrating section 240 shown in FIG. 1 decides a data sheet ID based on a result of the collation having a highest priority as the result of the data sheet collation, from out of a result of the collation by the character/graphics analyzing section 40 (the graphics collating section 80 or the identification code/data sheet ID identifying section 150) (a first priority), a result of the collation by the ruled-line collating section 180 (a second priority), and a result of the collation by the plane collating section 210 (a third priority).

As explained above, according to the seventh modification of the first embodiment, priorities are placed on a plurality of collation results, and a data sheet is uniquely identified from a result of the collation based on the priorities, as explained at step SP4 (reference FIG. 30). Therefore, it is possible to have an increased variation in identification.

In the first embodiment, when the data sheet X has been decided as a new data sheet, information (graphics, character strings, identification codes, plane information, ruled-line information) that represents the features of the new data sheet may be newly registered into the database (the graphic dictionary database 90, the identification code/data sheet ID database 160, the ruled-line information database 190, the plane database 220, or the identification database 250) according to the specification by the operator. This will be explained as an eighth modification of the first embodiment with reference to a flowchart shown in FIG. 31.

Figure 31:
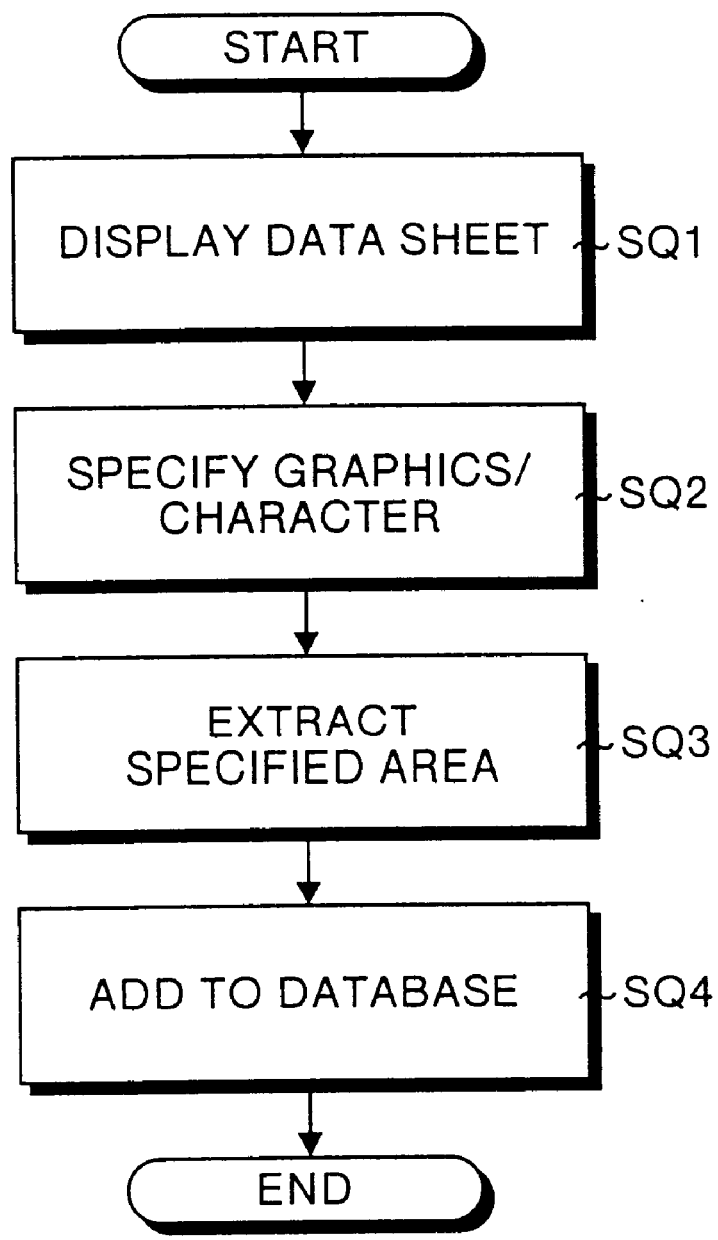
FIG. 31 is a flowchart for explaining an eighth modification of the first embodiment.

At step SQ1 shown in FIG. 31, the integrating section 240 makes the display section 270 display the image information of the data sheet that has been decided to be new. At step SQ2, the operator inputs data relating to the identification code, character string, etc. that show the features of this data sheet, from the keyboard (not shown). Next, at step SQ3, the operator specifies areas of graphics, planes, ruled lines or character strings displayed on the display section 270, with a mouse pointer (not shown).

Then, the integrating section 240 extracts the specified areas. At step SQ4, the integrating section 240 adds (registers) the information (graphics, character strings, identification codes, plane information, ruled-line information) that represents the features of the new data sheet and the new data sheet ID specified by the user, into the database (the graphic dictionary database 90, the identification code/data sheet ID database 160, the ruled-line information database 190, the plane database 220, or the identification database 250).

As explained above, according to the eighth modification of the first embodiment, when there has been a new data sheet, the information showing the features of the data sheet and the data sheet ID are newly registered in the database. Therefore, the reliability of the database increases. As a result, general application of the device can be improved further.

Figure 32:
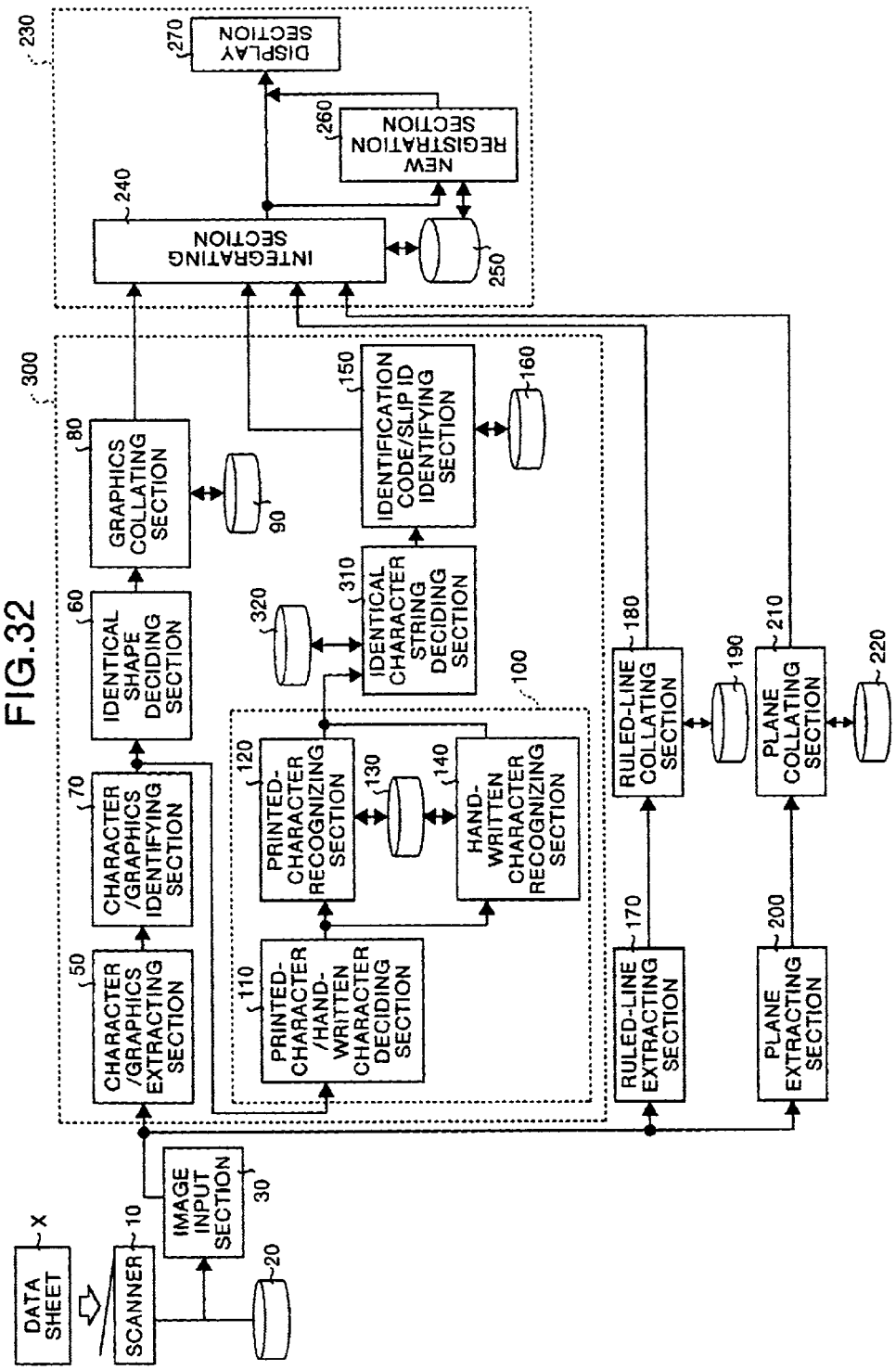
FIG. 32 is a diagram showing a structure of a second embodiment relating to the present invention.

In the first embodiment, the identical shape deciding section 60 is provided at the pre-stage of the character/graphics identifying section 70 shown in FIG. 1 thereby to decide the same shape. It is also possible to identify the same character by newly providing a identical character string deciding section 310 at the post-stage of the character recognizing section 100 as well as providing the identical shape deciding section 60 at the post-stage of the character/graphics identifying section 70 like a character/graphics analyzing section 300 as shown in FIG. 32. This will be explained below as a second embodiment of the present invention. In FIG. 32, portions identical with those in FIG. 1 are attached with like reference numbers, and their explanation will be omitted.

According to the second embodiment, the identical shape deciding section 60 shown in FIG. 32 makes a decision, like the operation in the first embodiment, as to whether or not there exist a plurality of graphics of which shapes are the same among graphics that have been identified as graphics by the character/graphics identifying section 70. The identical character string deciding section 310 makes a decision as to whether or not there exist a plurality of the same character strings (character strings each including at least two characters) among characters (character strings) that have been recognized as characters by the character recognizing section 100. A memory 320 temporarily stores various kinds of information that are used by the identical character string deciding section 310.

Figure 33:
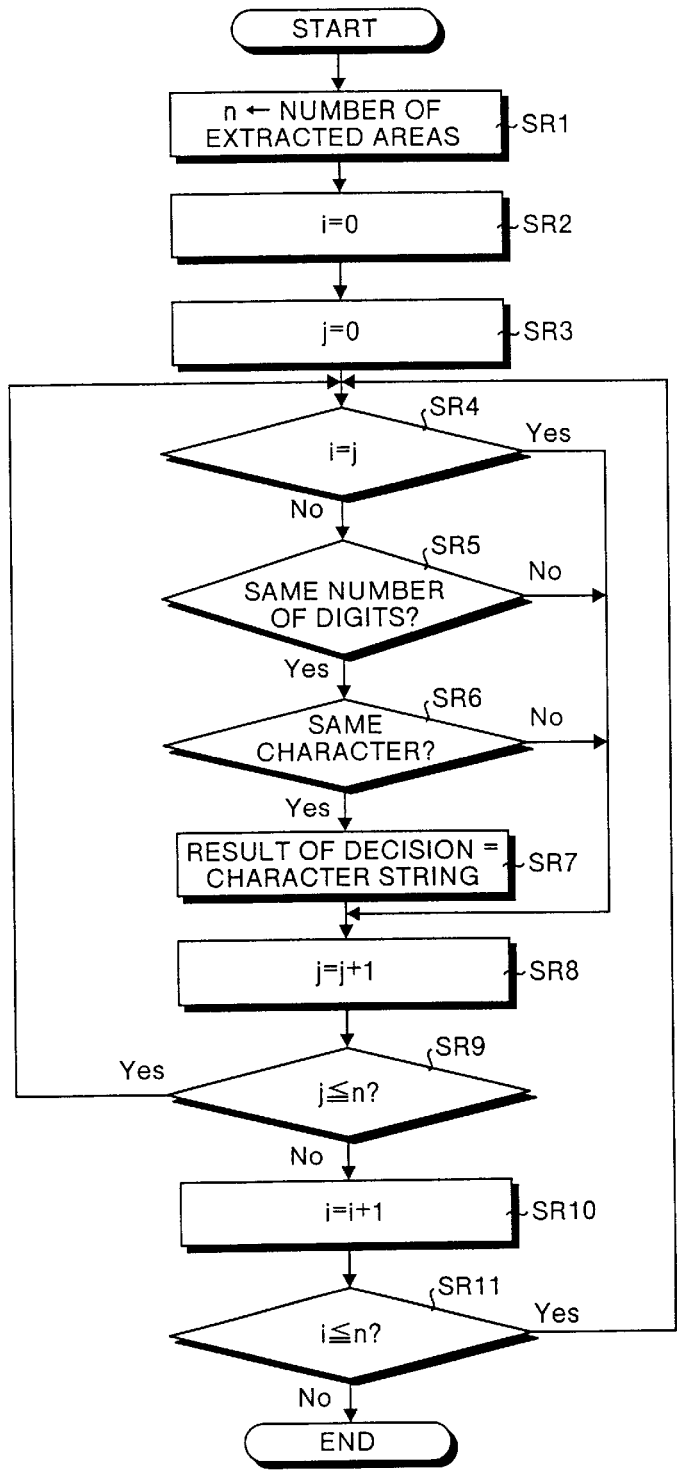
FIG. 33 is a flowchart for explaining the operation of an identical character string deciding section 310 shown in FIG. 32.
Figure 34:
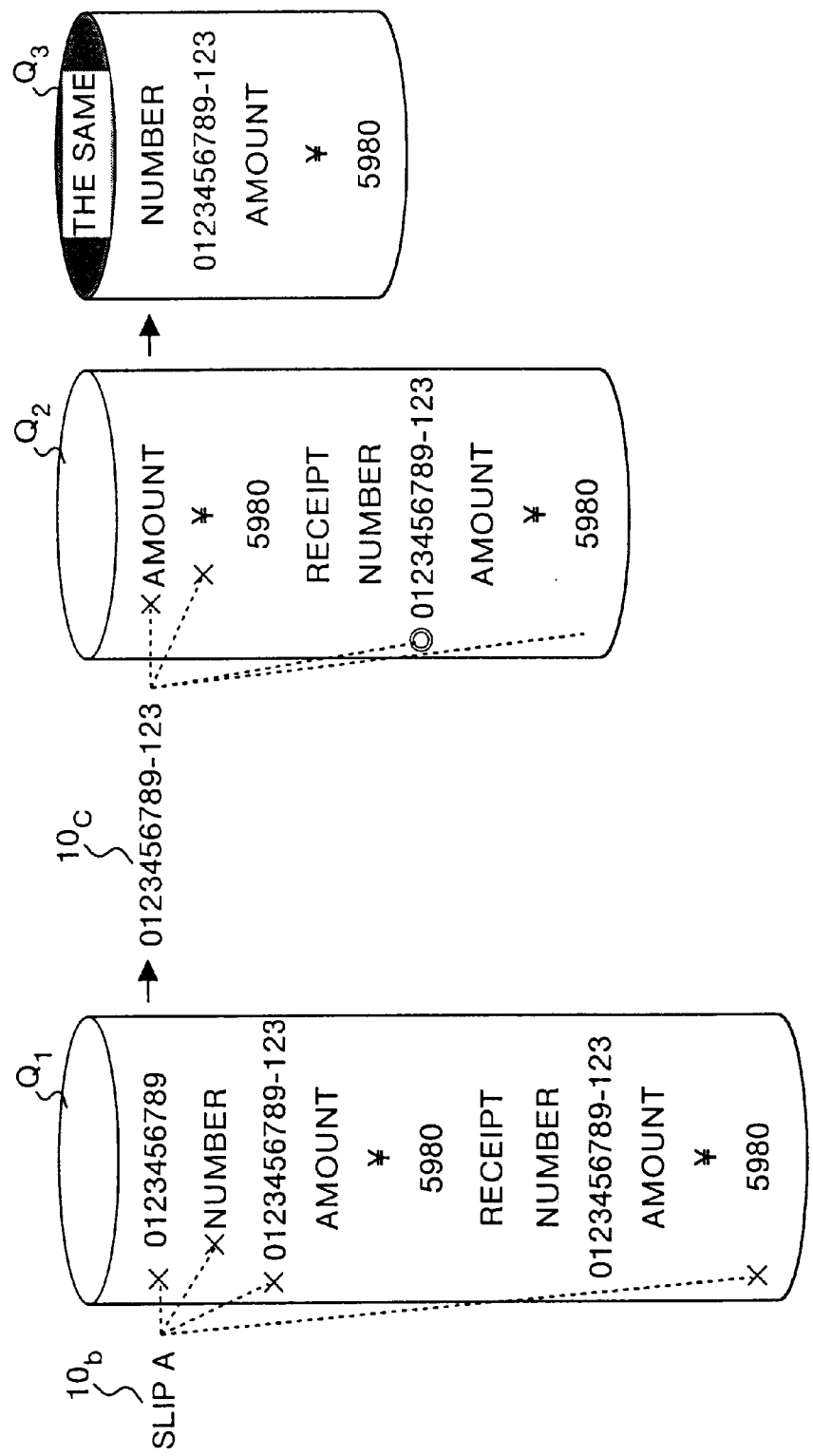
FIG. 34 is a diagram for explaining the operation of the identical character string deciding section 310 shown in FIG. 32.

The operation of the identical character string deciding section 310 will be explained next with reference to a flowchart shown in FIG. 33. At step SR1 shown in FIG. 33, the identical character string deciding section 310 substitutes the number of extracted areas into n. The number of extracted areas is the number of characters (character strings) that have been extracted by the character recognizing section 100. A group $Q_1$ shown in FIG. 34 is a set of characters (character strings) that have been recognized by the character recognizing section 100.

At stet SR2, the identical character string deciding section 310 substitutes 0 into a variable i. This variable i represents a target out of a plurality of characters (character strings). It is assumed that the target corresponding to the variable i (=0) is a character (character string) 10b (a "data sheet A" in this case) shown in FIG. 34. At step SR3, the identical character string deciding section 310 substitutes 0 into a variable j. This variable j represents a plurality of characters (character strings). In this case, the variable j (=0) corresponds to the character (character string) 10b (the "data sheet A" in this case).

At step SR4, the identical character string deciding section 310 makes a decision as to whether the variable i (=0) and the variable j (=0) coincide with each other or not. The identical character string deciding section 310 makes a decision of "Yes". At step SR8, the identical character string deciding section 310 increments the variable j by one to "1". The variable j (=1) represents a character string "0123456789" that is next to the character (character string) 10b within the group $Q_1$ shown in FIG. 34. At step SR9, the identical character string deciding section 310 makes a decision as to whether the variable j (=1) is equal to or less than the number of extracted areas n or not. In this case, the identical character string deciding section 310 sets "Yes" as a result of the decision. Thereafter, the above operation is repeated.

Then, a character (character string) 10c ("0123456789-123": reference FIG. 34) corresponding to the variable i is set as a target. The identical character string deciding section 310 sets "No" as a result of the decision made at step SR4. At step SR5, the identical character string deciding section 310 makes a decision as to whether the number of digits of the character (character string) 10c ("0123456789-123") corresponding to the variable i and the number of digits of the character string (for example "0123456789-123") corresponding to the variable j are the same or not. In this case, the identical character string deciding section 310 sets "Yes" as a result of the decision made at step SR5.

At step SR6, the identical character string deciding section 310 compares both character strings in one character unit to make a decision as to whether both characters are the same or not. The identical character string deciding section 310 sets "Yes" as a result of the decision made at step SR6. At step SR7, the identical character string deciding section 310 sets a result of the decision as the same character string, and inputs the character (character string) ("0123456789-123") into the same character string group $Q_3$. Thereafter, the above operation is repeated. When a result of the decision made at step SR11 has become "No", the identical character string deciding section 310 delivers the information of the character (character string) within the same character string group $Q_3$ to the identification code/data sheet ID identifying section 150.

As explained above, according to the second embodiment, data sheets are identified uniquely based on a result of the collation relating to the graphics that has been decided to have the same shape and the characters that have been decided to be the same. Therefore, it is possible to correctly identify data sheets that are otherwise erroneously identified based on a result of the conventional collation method relating to ruled lines. As a result, there is an effect that it is possible to improve the precision of identification. The above-described first embodiment (including the first modification to the eight modification) and the second embodiment are combined together according to the need for implementing the present invention.

According to the present invention, the data sheets are identified uniquely based on the result of the collation relating to graphics and characters that have been decided to have the same shapes respectively. Therefore, it is possible to correctly identify data sheets that are otherwise erroneously identified by the conventional identification method based on a result of the collation relating to ruled lines. As a result, there is an effect that it is possible to improve the precision of identification.

Further, according to the present invention, the data sheets are identified uniquely based on the result of the collation relating to graphics that have been decided to have the same shape and the characters that have been decided to be the same. Therefore, it is possible to correctly identify data sheets that are otherwise erroneously identified by the conventional identification method based on a result of the collation relating to ruled lines. As a result, there is an effect that it is possible to improve the precision of identification.

Further, according to the present invention, image information is adjusted such as, for example, noise is removed from the image information. Characters and graphics are then extracted from a result of this image adjustment. Therefore, there is an effect that it is possible to further improve the identification precision of the data sheets without receiving an influence of noise.

Further, according to the present invention, a correction including a rotation, an expansion and a contraction is carried out for characters and graphics that are to be compared among those that have been extracted. Therefore, there is an effect that it is possible to avoid an influence of image deterioration that is generated at the time of reading data sheets.

Further, according to the present invention, a method of deciding the same shape can also cover characters and graphics that are partly in the same shape. Therefore, there is an effect that it is possible to correctly identify the data sheets even if characters ad graphics have been partly damaged or lost due to the deterioration of the image.

Further, according to the present invention, data sheets are identified by also taking into account a result of the collation relating to ruled lines. Therefore, there is an effect that it is possible to correctly identify data sheets based on a result of the collation relating to ruled lines even if it is not possible to identify the data sheets based on a result of the collation relating to characters and graphics.

Further, according to the present invention, data sheets are identified by also taking into account a result of the collation relating to plane information. Therefore, there is an effect that it is possible to correctly identify data sheets based on a result of the collation relating to the plane information even if it is not possible to identify the data sheets based on a result of the collation relating to characters and graphics.

Further, according to the present invention, a priority order is applied to a plurality of results of collation, and the data sheets are uniquely identified from a result of the collation based on the priority order. Therefore, there is an effect that it is possible to increase the variation in identification of data sheets.

Further, according to the present invention, graphics are collated by also taking into account position information of graphics. Therefore, there is an effect that it is possible to avoid an erroneous identification of data sheets due to a difference in position.

Further, according to the present invention, characters are collated by also taking into account position information of characters. Therefore, there is an effect that it is possible to avoid an erroneous identification of data sheets due to a difference in position.

Further, according to the present invention, characters are collated by also taking into account font information of characters. Therefore, there is an effect that it is possible to avoid an erroneous identification of data sheets due to a difference in font information.

Further, according to the present invention, even if characters exist on a ruled line, only the characters are extracted without affecting the ruled line. Therefore, there is an effect that it is possible to further increase the identification precision of the data sheets.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data sheet identification device comprising:
   a character/graphics extracting unit which extracts characters strings each including at least one character and graphics from image information of a data sheet that has been read by an image reading unit;
   an identical shape deciding unit which
   compares each of the character strings and the graphics extracted with the rest of the character strings and the graphics extracted, and
   outputs the character string/strings and the graphic/graphics that has/have the same shape as at least another one of the character strings and the graphics extracted;
   a graphic collating unit which collates the graphic/graphics that has/have been output by the identical shape deciding unit with a graphic database in which a plurality of graphics showing features of a plurality of data sheets respectively have been registered;
   character collating unit which collates the characters string/strings that has/have been output by the identical shape deciding unit with a character database in which a plurality of characters showing features of the plurality of data sheets respectively have been registered; and
   an identifying unit which uniquely identifies the data sheet based on a result of the collation by said graphic collating unit and a result of the collation by said character collating unit.

2. The data sheet identification device according to claim 1, wherein said character/graphics extracting unit extracts the character strings and the graphics from image information that has been adjusted.

3. The data sheet identification device according to claim 1, wherein said identical shape deciding unit further compares one of the character strings and the graphics with another one of the character strings and the graphics that has been corrected by at least one of rotation, expansion, and contraction.

4. The data sheet identification device according to claim 1, wherein said identical shape deciding unit further compares a part of one of the character strings and the graphics with a part of another one of the character strings and the graphics, and outputs the part of one of the character strings and the graphics that has the same shape as the part of another one of the character strings and the graphics.

5. The data sheet identification device according to claim 1, further comprising:
   a ruled-line extracting unit which extracts ruled lines from the image information; and
   a ruled-line collating unit for collating the ruled lines that have been extracted by said ruled-line extracting unit with a ruled-line database in which a plurality of ruled lines showing features of the plurality of data sheets respectively have been registered, wherein
   said identifying unit uniquely identifies the data sheet based on the result of the collation by said graphic collating unit, the result of the collation by said character collating unit, and a result of the collation by said ruled-line collating unit.

6. The data sheet identification device according to claim 5, further comprising:
   a plane information extracting unit which extracts plane information including at least a filled area and a meshed area from the image information; and
   a plane information collating unit which collates the plane information that has been extracted by said plane information extracting unit with a plane information database in which a plurality of pieces of plane information showing features of the plurality of data sheets respectively have been registered, wherein
   said identifying unit uniquely identifies the data sheet based on the result of the collation by said graphic collating unit, the result of the collation by said character collating unit, the result of the collation by said ruled-line collating unit, and a result of the collation by said plane information collating unit.

7. The data sheet identification device according to claim 6, wherein said identifying unit selects one of the results of collation according to a predetermined priority order, and uniquely identifies the data sheet based on the selected result of the collation.

8. The data sheet identification device according to claim 1, wherein said graphic collating unit collates the graphic/graphics that has/have been output by the identical shape deciding unit and position information of the graphic/graphics with a graphic database in which a plurality of graphics and position information of the plurality of graphics showing features of the plurality of data sheets respectively have been registered.

9. The data sheet identification device according to claim 1, wherein said character collating unit collates the character string/strings that has/have been output by the identical shape deciding unit and position information of the character string/strings with a character database in which a plurality of characters and position information of the plurality of characters showing features of the plurality of data sheets respectively have been registered.

10. The data sheet identification device according to claim 1, wherein said character collating unit collates the character string/strings that has/have been output by the identical shape deciding unit and font information of the the character string/strings with a character database in which a plurality of characters and font information of the plurality of characters showing features of a plurality of data sheets respectively have been registered.

11. The data sheet identification device according to claim 1, wherein said character/graphics extracting unit extracts from the image information a part pattern in which pixels constituting a straight line portion of a ruled line and pixels constituting characters are connected, and separates the straight line portion from the characters based on the part pattern, thereby to extract the characters.

12. A data sheet identification device comprising:
   a character/graphics extracting unit which extracts character strings each including at least one character and graphics from image information of a data sheet that has been read by image reading unit;
   an identical shape deciding unit which
   compares each of the graphics extracted with the rest of the graphics extracted, and
   outputs the graphic/graphics that has/have the same shape as at least another one of the graphics extracted;
   a graphic collating unit which collates the graphic/graphics that has/have been output by the identical shape deciding unit a graphic database in which a plurality of graphics showing features of a plurality of data sheets respectively have been registered;
   an identical character deciding unit which
   compares each of the character strings extracted with the rest of the character strings extracted, and outputs the character string/strings that has/have the same shape as at least another one of the character strings extracted;

a character collating unit which collates character string/strings that has/have been output by the identical character deciding unit with a character database in which a plurality of characters showing features of the plurality of data sheets respectively have been registered; and an identifying unit which uniquely identifies the data sheet based on a result of the collation by said graphic collating unit and a result of the collation by said character collating unit.

13. The data sheet identification device according to claim 12, wherein said character/graphics extracting unit extracts the character strings and the graphics from image information that has been adjusted.

14. The data sheet identification device according to claim 12, further comprising:

a ruled-line extracting unit which extracts ruled lines from the image information; and a ruled-line collating unit for collating the ruled lines that have been extracted by said ruled-line extracting unit with a ruled-line database in which a plurality of ruled lines showing features of the plurality of data sheets respectively have been registered, wherein said identifying unit uniquely identifies the data sheet based on the result of the collation by said graphic collating unit, the result of the collation by said character collating unit, and a result of the collation said the ruled-line collating unit.

15. The data sheet identification device according to claim 14, further comprising:

a plane information extracting unit which extracts plane information including at least a filled area and a meshed area from the image information; and a plane information collating unit which collates the plane information that has been extracted by said plane information extracting unit with a plane information database in which a plurality of pieces of plane information showing features of the plurality of data sheets respectively have been registered, wherein said identifying unit uniquely identifies the data sheet based on the result of the collation by said graphic collating unit, the result of the collation by said character collating unit, the result of the collation by said ruled-line collating unit, and a result of the collation by said plane information collating unit.

16. The data sheet identification device according to claim 15, wherein said identifying unit selects one of the results of collation according to a predetermined priority order, and uniquely identifies the data sheet based on the selected result of collation.

17. The data sheet identification device according to claim 12, wherein said graphic collating unit collates the graphic/graphics that has/have been output by the identical shape deciding unit and position information of the graphic/graphics with a graphic database in which a plurality of graphics and position information of the plurality of graphics showing features of the plurality of data sheets respectively have been registered.

18. The data sheet identification device according to claim 12, wherein said character/graphics extracting unit extracts from the image information a part pattern in which pixels constituting a straight line portion of a ruled line and pixels constituting characters are connected, and separates the straight line portion from the characters based on the part pattern, thereby to extract the characters.

* * * * *